(12) United States Patent
Bogolea et al.

(10) Patent No.: US 12,177,387 B2
(45) Date of Patent: *Dec. 24, 2024

(54) METHOD FOR STOCK KEEPING IN A STORE WITH FIXED CAMERAS

(71) Applicant: Simbe Robotics, Inc., South San Francisco, CA (US)

(72) Inventors: Bradley Bogolea, South San Francisco, CA (US); Mirza Akbar Shah, South San Francisco, CA (US); Lorin Vandegrift, South San Francisco, CA (US); Luke Fraser, South San Francisco, CA (US); Jariullah Safi, South San Francisco, CA (US); Jeffrey Gee, South San Francisco, CA (US); Durgesh Tiwari, South San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,901

(22) Filed: Jan. 20, 2023

(65) Prior Publication Data

US 2023/0421705 A1 Dec. 28, 2023

Related U.S. Application Data

(63) Continuation of application No. 16/880,582, filed on May 21, 2020, now Pat. No. 11,593,755, which is a
(Continued)

(51) Int. Cl.
*G06Q 10/087* (2023.01)
*G05D 1/00* (2006.01)
(Continued)

(52) U.S. Cl.
CPC ............ *H04N 1/00* (2013.01); *G05D 1/0274* (2013.01); *G05D 1/0282* (2013.01); *G06F 18/21* (2023.01);
(Continued)

(58) Field of Classification Search
CPC .................................................. G06Q 10/087
See application file for complete search history.

(56) References Cited

U.S. PATENT DOCUMENTS 8,577,136 B1 * 11/2013 Ascher ................. G06Q 10/087
382/165
10,157,452 B1 * 12/2018 Tighe ........................ G06T 5/80
(Continued)

OTHER PUBLICATIONS

Algburi, Muhanad H., and Songül Albayrak. "Store products recognition and counting system using computer vision." 2017 9th International Conference on Computational Intelligence and Communication Networks (CICN). IEEE, 2017. (Year: 2017).*

*Primary Examiner* — Nathan A Mitchell
(74) *Attorney, Agent, or Firm* — Run8 Patent Group, LLC; Peter Miller

(57) ABSTRACT

One variation of a method for stock keeping in a store includes: accessing an image captured by a fixed camera within the store; retrieving a field of view of the fixed camera; estimating a segment of an inventory structure in the store depicted in the image based on a projection of the field of view onto a planogram of the store; identifying a set of slots within the inventory structure segment; retrieving a product model representing a set of visual characteristics of a product type assigned to a slot, in the set of slots, by the planogram; extracting a constellation of features from the image; if the constellation of features approximates the set of visual characteristics in the product model, detecting presence of a product unit of the product type occupying the
(Continued)

inventory structure segment; and representing presence of the product unit, occupying the inventory structure segment, in a realogram.

20 Claims, 5 Drawing Sheets

Related U.S. Application Data continuation-in-part of application No. 16/817,972, filed on Mar. 13, 2020, now Pat. No. 10,891,589, which is a continuation of application No. 16/578,406, filed on Sep. 23, 2019, now Pat. No. 11,341,454, said application No. 16/880,582 is a continuation of application No. 15/600,527, filed on May 19, 2017, now Pat. No. 10,467,587.

(60) Provisional application No. 62/818,080, filed on Mar. 13, 2019, provisional application No. 62/339,039, filed on May 19, 2016.

(51) Int. Cl.
| | | |
|---|---|---|
| *G06F 18/21* | (2023.01) | |
| *G06F 18/22* | (2023.01) | |
| *G06V 10/75* | (2022.01) | |
| *G06V 10/98* | (2022.01) | |
| *G06V 20/52* | (2022.01) | |
| *H04N 1/00* | (2006.01) | |
| *H04N 23/60* | (2023.01) | |
| *H04N 23/698* | (2023.01) | |
| *H04N 23/80* | (2023.01) | |
| *H04N 25/61* | (2023.01) | |

(52) U.S. Cl.
CPC ........... *G06F 18/22* (2023.01); *G06Q 10/087* (2013.01); *G06V 10/751* (2022.01); *G06V 10/987* (2022.01); *G06V 20/52* (2022.01); *H04N 23/60* (2023.01); *H04N 23/698* (2023.01); *H04N 23/80* (2023.01); *H04N 25/61* (2023.01); *G05D 1/0246* (2013.01)

(56) References Cited

U.S. PATENT DOCUMENTS

| | | | |
|---|---|---|---|
| 10,535,146 B1* | 1/2020 | Buibas | G06T 17/00 |
| 10,789,483 B1* | 9/2020 | Ren | G06Q 10/087 |
| 11,126,861 B1* | 9/2021 | Evans | H04N 23/74 |
| 11,580,493 B2* | 2/2023 | Bizoara | G06V 20/52 |
| 11,810,362 B1* | 11/2023 | Siddiquie | G06F 16/587 |
| 2009/0059270 A1* | 3/2009 | Opalach | G06V 20/64 |
| | | | 358/1.15 |
| 2009/0063307 A1* | 3/2009 | Groenovelt | G06Q 10/087 |
| | | | 705/28 |
| 2012/0323620 A1* | 12/2012 | Hofman | G06Q 10/087 |
| | | | 705/7.11 |
| 2015/0262116 A1* | 9/2015 | Katircioglu | G06Q 10/087 |
| | | | 705/28 |
| 2016/0171707 A1* | 6/2016 | Schwartz | G06F 18/22 |
| | | | 382/180 |
| 2016/0371634 A1* | 12/2016 | Kumar | G06V 10/462 |
| 2017/0032311 A1* | 2/2017 | Rizzolo | G06V 10/25 |
| 2017/0178227 A1* | 6/2017 | Graham | G06Q 30/0643 |
| 2017/0193430 A1* | 7/2017 | Barreira Avegliano | |
| | | | B64U 10/14 |
| 2017/0286901 A1* | 10/2017 | Skaff | G05D 1/0246 |
| 2017/0300926 A1* | 10/2017 | Stout | G06Q 10/087 |
| 2018/0107999 A1* | 4/2018 | Rizzolo | H04N 23/90 |
| 2019/0156273 A1* | 5/2019 | Fisher | G06N 3/08 |
| 2019/0156277 A1* | 5/2019 | Fisher | G06N 3/08 |
| 2019/0197561 A1* | 6/2019 | Adato | G06T 7/73 |
| 2019/0215424 A1* | 7/2019 | Adato | G06T 7/55 |
| 2020/0005225 A1* | 1/2020 | Chaubard | H04N 23/698 |
| 2020/0074402 A1* | 3/2020 | Adato | G06V 20/52 |
| 2021/0004756 A1* | 1/2021 | Kulkarni Wadhonkar | |
| | | | G06V 20/52 |
| 2021/0042588 A1* | 2/2021 | Shaw | G06Q 30/06 |
| 2021/0097478 A1* | 4/2021 | Yang | G06V 20/20 |
| 2021/0398060 A1* | 12/2021 | Chaubard | G06T 7/70 |
| 2021/0400195 A1* | 12/2021 | Adato | G06Q 20/208 |
| 2022/0076027 A1* | 3/2022 | Evans | H04N 23/58 |
| 2022/0303445 A1* | 9/2022 | Skaff | H04N 23/57 |

* cited by examiner

METHOD FOR STOCK KEEPING IN A STORE WITH FIXED CAMERAS

CROSS-REFERENCE TO RELATED APPLICATIONS

This application is a continuation application of U.S. patent application Ser. No. 16/880,582, filed on 31 Jul. 2020, which is: a continuation-in-part application of U.S. patent application Ser. No. 16/817,972, filed on 13 Mar. 2020, which claims priority to U.S. Provisional Patent Application No. 62/818,080, filed on 13 Mar. 2019; and a continuation-in-part application of U.S. patent application Ser. No. 16/578,406, filed on 23 Sep. 2019, which is a continuation application of U.S. patent application Ser. No. 15/600,527, filed on 19 May 2017, which claims the benefit of U.S. Provisional Application No. 62/339,039, filed on 19 May 2016; each of which is incorporated in its entirety by this reference.

TECHNICAL FIELD

This invention relates generally to the field of stock keeping and more specifically to a new and useful method for stock keeping in a store with fixed cameras in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
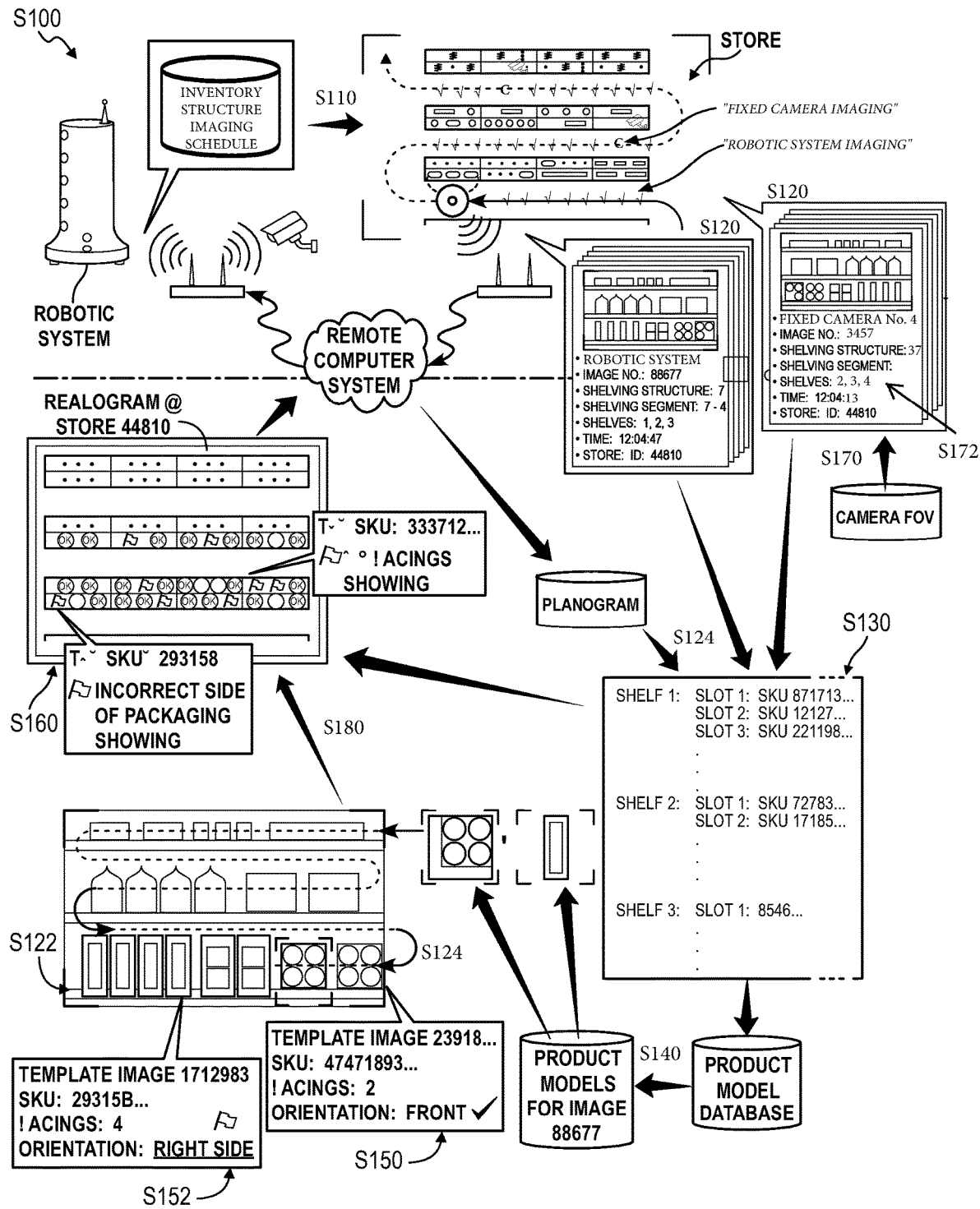
FIG. 1 is a flowchart representation of a method.
Figure 6:
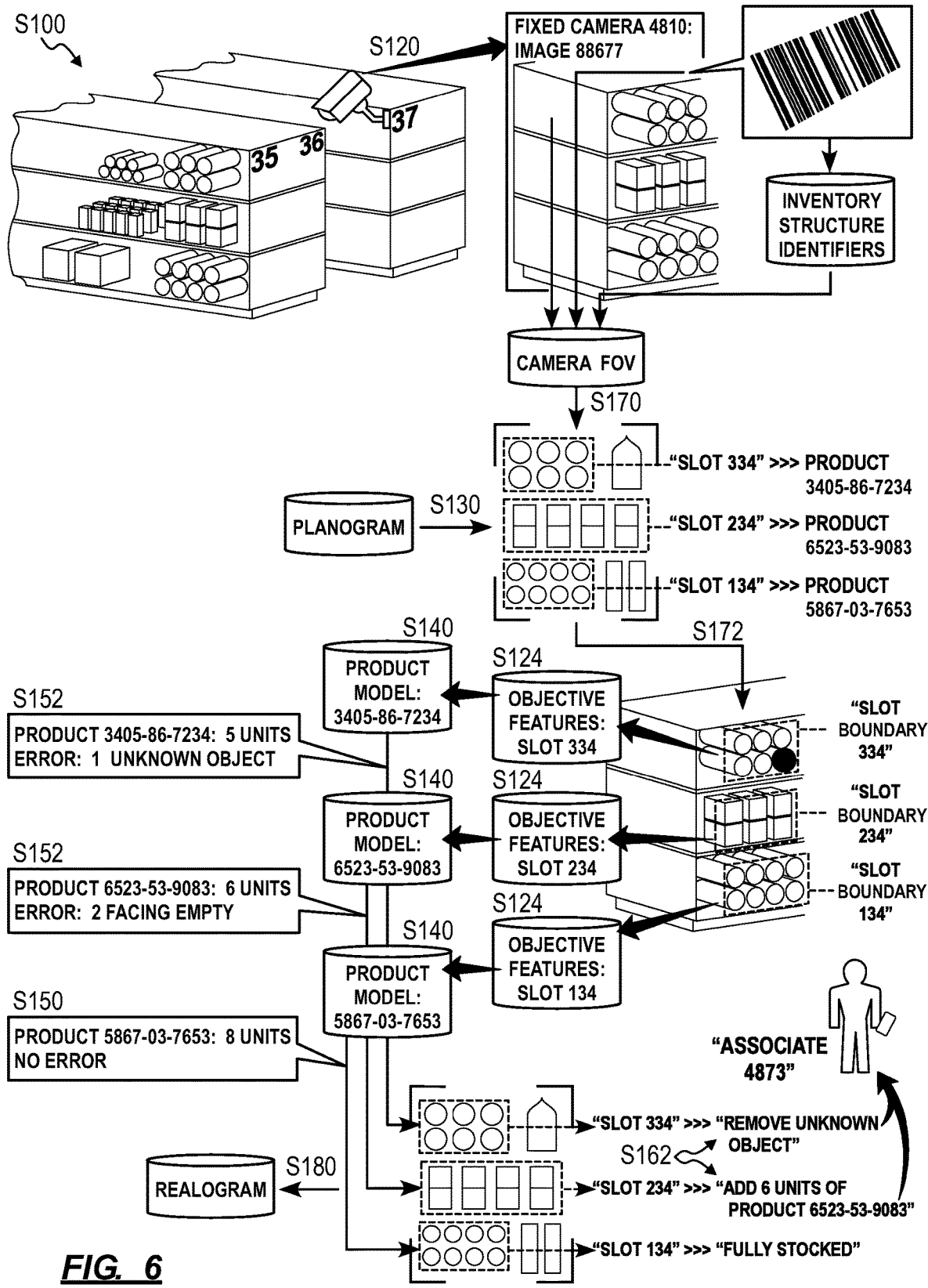
FIG. 6 is a flowchart representation of one variation of the method.

As shown in FIGS. 1 and 6, a method S100 for stock keeping in a store includes: accessing a photographic image captured by a fixed camera, arranged within a store, at a first time in Block S120; retrieving a geometry of a field of view of the fixed camera at the first time in Block S170; estimating a segment of an inventory structure in the store depicted in the photographic image based on a projection of the geometry of the field of view onto a planogram of the store in Block S172; identifying a set of slots within the segment of the inventory structure in Block S130; retrieving a first product model representing a first set of visual characteristics of a first product type assigned to a first slot, in the set of slots, by the planogram in Block S140; extracting a first constellation of features from the photographic image in Block S124; detecting presence of a first product unit of the first product type occupying the segment of the inventory structure at the first time in response to the first constellation of features approximating the first set of visual characteristics represented in the first product model in Block S150; and representing presence of the first product unit, occupying the segment of the inventory structure at the first time, in a realogram in Block S180.

2. Applications

Generally, Blocks of the method S100 can be executed by a computer system: to access an image (e.g., photographic color image, a photographic black-and-white image, and/or a depth image) captured by a fixed camera arranged within a store (e.g., a grocery store or other retail space); to isolate a region of this image that depicts a segment of an inventory structure; to locate this segment of the inventory structure in a segment of a planogram that defines product location throughout the store; to leverage product type and location assignments defined in this segment of the planogram to select a small number of product models (e.g., template images, color histograms, text strings) that represent characteristics of types of product units likely depicted in the region of the image; and identify quantities, orientations, and locations of product units of these product types in this segment of the inventory structure based on alignment between features extracted from the region of the image and characteristics represented in these product models. The computer system can then store these quantities, orientations, and locations of product units of these product types into a realogram that represents the stock condition of the segment of the inventory structure at the time the image was captured by the fixed camera. The computer system can also: detect differences in types, quantities, orientations, and locations of these product units detected in this image of the inventory structure and quantities, orientations, and locations of product types assigned to this inventory structure by the planogram; and generate real-time restocking prompts and/or populate a global restocking list for the store accordingly.

Therefore, rather than identify product units in an image of inventory structure by scanning a large corpus of product models for characteristics that match constellations of features extracted from this image, the computer system can instead leverage an existing planogram of the store to identify a small set of product types assigned to this inventory structure, retrieve product models for this small set of product types, and then compare these product models to constellations of features extracted from this image in order to: positively identify individual product units of these product types; and to flag other product units not matched to any one of these product models as out of place on the inventory structure. In particular, the computer system can: predict types of products occupying an inventory structure in a store based on product types assigned to this inventory structure by a planogram of the store; retrieve product models for these product types; and then compare these product models to constellations of features extracted from an image of the inventory structure in order to positively identify some, many, or all of these product units and to distinguish other unidentified product units as out of place on the inventory structure.

Furthermore, the computer system can execute Blocks of the method S100 to identify product units in images: characterized by low (e.g., less than 5%) or no overlap between images captured by adjacent fixed cameras; and/or characterized by low product unit resolution (e.g., fewer than five pixels per linear inch at a plane of a face of a product unit). For example, a population of fixed cameras can be arranged at relatively low density throughout the store or at a limited number of key locations throughout the store, wherein each fixed camera defines a field of view spanning multiple slots, an entire shelf, multiple shelves, or an entire shelving segment within an inventory structure (e.g., rather than spanning a single slot) such that resolution of individual product units and shelf tags in images captured by the fixed camera is relatively low. Therefore, rather than or in addition to identifying a product type assigned to a slot depicted in an image based on a product identifier read from a corresponding shelf tag depicted in the image, the computer system can identify this slot depicted in the image (e.g., based on a known location of the fixed camera) and retrieve a product type assigned to this slot by the planogram.

Accordingly, this relatively small population of fixed cameras can be installed throughout the store with fewer changes to existing electrical infrastructure. This relatively small population of fixed cameras can also transmit a relatively small quantity of images to the computer system for processing per unit time, thereby limiting total network bandwidth consumed by the fixed cameras and limiting changes to existing network infrastructure necessary to support operation of these fixed cameras. However, the computer system can execute Blocks of the method to consistently and accurately derive types, locations, and orientations of product units throughout the store from images—exhibiting lower object-level resolutions—captured by these fixed cameras.

The computer system can implement similar methods and techniques to access and process images captured by a mobile robotic system (hereinafter the "robotic system") while autonomously navigating throughout the store. For example, the computer system can: dispatch the robotic system to capture images of product units arranged on shelves throughout the store; derive stock conditions of slots throughout the store based on types, orientations, and locations of product units identified in these images; and update the realogram to reflect these stock conditions.

For example, in one application in which fixed cameras are installed at low density throughout the store (e.g., with no or less than 5% overlap of fields of view of these fixed cameras at inventory structure shelf faces), the computer system can: dispatch the robotic system to capture images of inventory structures not imaged by these fixed cameras or imaged at low product unit resolution; and then process these images according to Blocks of the method in order to derive stock conditions of slots in these inventory structures and/or to verify stock conditions of slots derived from images captured by fixed cameras. Furthermore, in this example, the computer system can: regularly detect stock conditions in slots depicted in images returned by these fixed cameras (e.g., once per minute) and update slot representations in the realogram in (near) real-time accordingly; and intermittently detect stock conditions in slots depicted in images returned by the robotic system (e.g., once per two-hour interval) and update the realogram in accordingly.

The computer system can then: package differences types, orientations, and locations of product units detected in these images—captured by fixed cameras and/or the robotic system—and orientations and locations of product type designated in the planogram into restocking prompts for individual slots throughout the store and/or into a global restocking list for the store; and distribute these restocking prompts and the global restocking list to mobile devices affiliated with or assigned to associates of the store in order to guide targeted, efficient maintenance and stock keeping throughout the store.

3. Hierarchy and Terms

A "product type" is referred to herein as a type of a product—such as associated with a unit SKU value or other unique product identifier—designated for stocking in a slot within an inventory structure in the store by a planogram. A "planogram" is referred to herein as a record (e.g., a graphical representation) of: slots in inventory structures throughout the store; and product types, product quantities, product orientations, and/or quantities of product facings of product types assigned to these slots. More specifically, a planogram is described herein as a target stock state of the store, such as in the form of a graphical representation of identifiers and locations assigned to each inventory structure in the store. A realogram is described herein as a representation (or approximation) of the actual stock state of the store, such as in the form of a graphical representation of identifiers of product units and their locations detected on inventory structures based on a last set of images received from the robotic system and/or fixed cameras deployed to the store.

A "slot" is referred to herein as a section (or a "bin") of a "produce display" designated for occupation by a set of loose product units, such as the same class, type, and varietal. A produce display can include an open, closed, humidity-controller, temperature-controlled, and/or other type of produce display containing one or more slots on one or more shelves. A "store" is referred to herein as a (static or mobile) facility containing one or more produce displays. A "product facing" is referred to herein as a product unit—in a row or column of product units of a product type—visible at the front of a slot.

A "product unit" is referred to herein as an instance of a particular product type and therefore represents one unit of a particular product identifier (e.g., a SKU).

The method S100 is described herein as executed by a computer system (e.g., a remote server, hereinafter a "computer system"). However, the method S100 can be executed by one or more robotic systems placed in a retail space (or store, warehouse, etc.), by a local computer system, or by any other computer system—hereinafter a "system."

Furthermore, the method S100 is described below as executed by the remote computer system to identify types and locations of product units stocked on open shelves on inventory structures within a store. However, the remote computer system can implement similar methods and techniques to identify product units stocked in cubbies, in a refrigeration unit, on a hot food (e.g., hotdog) rack, on a wall rack, in a freestanding floor rack, on a table, or on or in any other product organizer in a retail space.

4. Robotic System

A robotic system autonomously navigates throughout a store and records images—such as color (e.g., RGB) images of packaged goods and hyper-spectral images of fresh produce and other perishable goods—continuously or at discrete predefined waypoints throughout the store during a scan cycle. Generally, the robotic system can define a network-enabled mobile robot that can autonomously: traverse a store; capture color and/or hyper-spectral images of inventory structure, shelves, produce displays, etc. within the store; and upload those images to the remote computer system for analysis, as described below.

Figure 3:
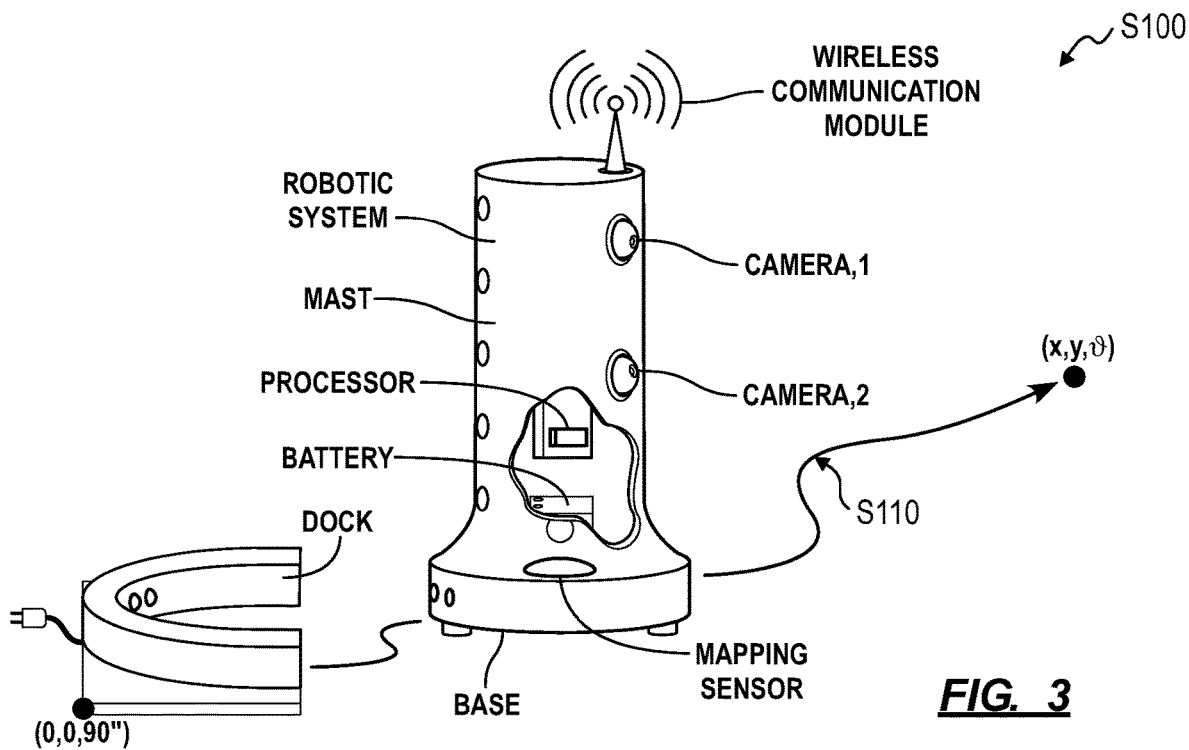
FIG. 3 is a flowchart representation of one variation of the method.

In one implementation shown in FIG. 3, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of color cameras arranged on the mast; one or more hyper-spectral sensors (or "cameras," "imagers") arranged on the mast and configured to record hyper-spectral images representing intensities of electromagnetic radiation within and outside of the visible spectrum; and a wireless communication module that downloads waypoints and a master map of a store from a computer system (e.g., a remote server) and that uploads photographic images captured by the camera and maps generated by the processor to the remote computer system. In this implementation, the robotic system can include cameras and hyper-spectral sensors mounted statically to the mast, such as two vertically offset cameras and hyper-spectral sensors on a left side of the mast and two vertically offset cameras and hyper-spectral sensors on the right side of mast. The robotic system can additionally or alternatively include articulable cameras and hyper-spectral sensors, such as: one camera and hyper-spectral sensor on the left side of the mast and supported by a first vertical scanning actuator; and one camera and hyper-spectral sensor on the right side of the mast and supported by a second vertical scanning actuator. The robotic system can also include a zoom lens, a wide-angle lens, or any other type of lens on each camera and/or hyper-spectral sensor.

In one variation described below, the robotic system further includes a wireless energy/wireless charging subsystem configured to broadcast a signal toward a fixed camera installed in the store in order to recharge this fixed camera. However, the robotic system can define any other form and can include any other subsystems or elements supporting autonomous navigating and image capture throughout a store environment.

Furthermore, multiple robotic systems can be deployed in a single store and can be configured to cooperate to image shelves within the store. For example, two robotic systems can be placed in a large single-floor retail store and can cooperate to collect images of all shelves and produce displays in the store within a threshold period of time (e.g., within one hour). In another example, one robotic system can be placed on each floor of a multi-floor store, and each robotic system can each collect images of shelves and produce displays on its corresponding floor. The remote computer system can then aggregate color and/or hyper-spectral images captured by multiple robotic systems placed in one store to generate a graph, map, table, and/or task list for managing distribution and maintenance of product throughout the store.

4.1 Robotic System Deployment and Scan Cycle

Block S110 of the method S100 recites dispatching a robotic system to autonomously navigate throughout a store and to record images of inventory structures within the store during a scan cycle. Generally, in Block S110, the computer system can dispatch the robotic system to autonomously navigate along a preplanned sequence of waypoints or along a dynamic path and to record photographic images and radar scans (and/or depth images) of inventory structures throughout the store.

4.1.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store; and the computer system can dispatch the robotic system to execute a scan cycle during store hours, including navigating to each waypoint throughout the store and collecting data representative of the inventory state of the store in near real-time as patrons move throughout the store. During this scan cycle, the robotic system can: record a sequence of radar scans (e.g., at a rate of 10 Hz) while navigating from one waypoint to a next waypoint; record a photographic (e.g., color, black-and-white) image of an inventory structure upon reaching a next waypoint; and repeat this process for each subsequent waypoint scheduled for this scan cycle. The robotic system can then upload these photographic images and radar scans to the computer system, such as in real-time or upon conclusion of the scan cycle. The computer system can then: detect types and quantities of packaged goods stocked in slots on inventory structures in the store based on data extracted from these photographic images and radar scans; and aggregate these data into a realogram of the store in Block S180.

The computer system can therefore maintain, update, and distribute a set of waypoints to the robotic system, wherein each waypoint defines a location within a store at which the robotic system is to capture one or more images from the integrated cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system. When executing a waypoint, the robotic system can orient to (e.g., within 1.5° of) the target orientation defined in the waypoint in order to align the suite of photographic and depth cameras to an adjacent shelving structure or inventory structure.

When navigating to a next waypoint, the robotic system can scan its environment with the same or other depth sensor (e.g., a LIDAR sensor, as described above), compile depth scans into a new map of the robotic system's environment, determine its location within the store by comparing the new map to a master map of the store defining the coordinate system of the store, and capture a sequence of radar scans while navigating to a position and orientation within the store at which the output of the depth sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the depth sensors, as described above.

However, the robotic system can implement any other methods or techniques to navigate to a position and orientation in the store that falls within a threshold distance and angular offset from a location and target orientation defined by a waypoint.

4.1.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of product types assigned to slots throughout the store, such as defined in a planogram; etc.

In this implementation, the robotic system can then continuously capture photographic images, radar scans, and/or depth images (hereinafter "scan data") of inventory structures in the store (e.g., at rates of 10 Hz, 20 Hz, 24 Hz). However, in this implementation, the robotic system can capture images and radar scans of inventory structures within the store at any other frequency during a scan cycle.

4.1.3 Scan Cycle Scheduling

In one implementation, the robotic system continuously navigates and captures scan data of inventory structures within the store; when a state of charge of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of inventory state changes as patrons remove, return, and/or move product units throughout the store; and/or every night during close or slow hours (e.g., 1 AM) to enable detection of inventory states and systematic restocking of understocked slots in the store before the store opens the following morning or before a next peak period in the store.

However, the computer system can dispatch the robotic system to execute scan cycles according to any other fixed or dynamic schedule.

4.2. Robotic System Image Access

Block S120 of the method S100 recites accessing an image of an inventory structure captured by the robotic system during the scan cycle. Generally, the robotic system can return images (e.g., photographic images and radar scans) recorded during the scan cycle to a remote database, such as in real-time during the scan cycle, upon completion of the scan cycle, or during scheduled upload periods within the scan cycle. The computer system can then access these images from this database in Block S120 before processing these images according to Blocks of the method S100 described below. For example, the robotic system can upload these images to the computer system over a cellular connection or via a computer network (e.g., the Internet) substantially in real-time. Alternatively, the robotic system can store these raw images in local memory and upload groups of raw images to the computer system en bloc (e.g., as a block of images recorded along one shelving structure or along one aisle of the store).

Upon receipt of images from the robotic system, the computer system (e.g., the remote computer system) can assimilate these raw images for subsequent processing. In one example, the computer system dewarps a raw image to remove fisheye effects resulting from a wide-angle lens connected to the camera that recorded the image and then processes this corrected image in subsequent Blocks of the method S100. In another example, the computer system can: compare the actual position and orientation of the robotic system at the time the raw image was captured (e.g., as stored in image metadata) to the target location and target orientation defined in a nearest waypoint; transform (e.g., skew, dewarp) the raw image to represent a field of view of the camera were the robotic system positioned at the target location and orientation defined in the waypoint; and then processes this corrected image in subsequent Blocks of the method S100. However, the computer system can modify, dewarp, or otherwise manipulate an image captured by the robotic system in any other way.

In another implementation, the computer system processes individual photographic images according to the method S100 in order to identify types of product units depicted in these individual images. Alternatively, the computer system can: stitch multiple photographic images into one composite photographic image representing a greater length of one inventory structure (or greater length of multiple adjacent inventory structures); and then process this "composite" photographic image according to methods and techniques described below.

4.3. Image Segmentation

Upon receipt of an image from the robotic system, the computer system can segment the image into discrete regions depicted individual product units or groups of product units. For example, the computer system can segment the image by slot, shelf, shelving segment, or shelving structure based on: slot boundaries projected from the planogram onto the image; slot boundaries located according to shelf tags detected in the image; shelf regions defined by shelf features detected in the image; and/or shelving segment regions defined by shelving segment uprights detected in the image. The computer system can then process each region of the image according to methods and techniques described below to identity types, locations, orientations, and/or absence of product units in each region of the image.

4.3.1 Shelving Segment Segmentation

In one implementation, the computer system implements computer vision techniques to distinguish a shelving segment represented within an image (e.g., a panoramic image of a shelving structure containing multiple shelving segments). In one example, the computer system scans the image for an area of interest including the shelving structure and crops the image around this area of interest, such as by cropping the image around a lowermost linear edge and around an uppermost (linear or nonlinear) edge in order to remove areas of the image representing a floor surface in front of the shelving structure and a ceiling and open volume above the shelving structure. In this example, the computer system can then: scan the area of interest in the image for (substantial, approximately) continuous vertical lines, such as by detecting features in the image and extracting substantially vertical, substantially linear curves extending from proximal the bottom to proximal the top of the area of interest; extract a region of the area of interest in the image (or crop the area of interest in the image) between two adjacent vertical lines offset by a real distance approximately a known width of shelving segments in the shelving structure; and label this region or area of interest of the image as representing a single shelving segment. The computer system can also implement methods and techniques described below to write an address of the shelving segment to this image region.

The computer system can repeat this process for each other region of the image between two vertical lines (e.g., substantially linear curves extending from proximal the bottom to proximal the top of the area of interest in the image) delineating discrete shelving segments within the shelving structure.

4.3.2 Shelf Segmentation

Figure 4:
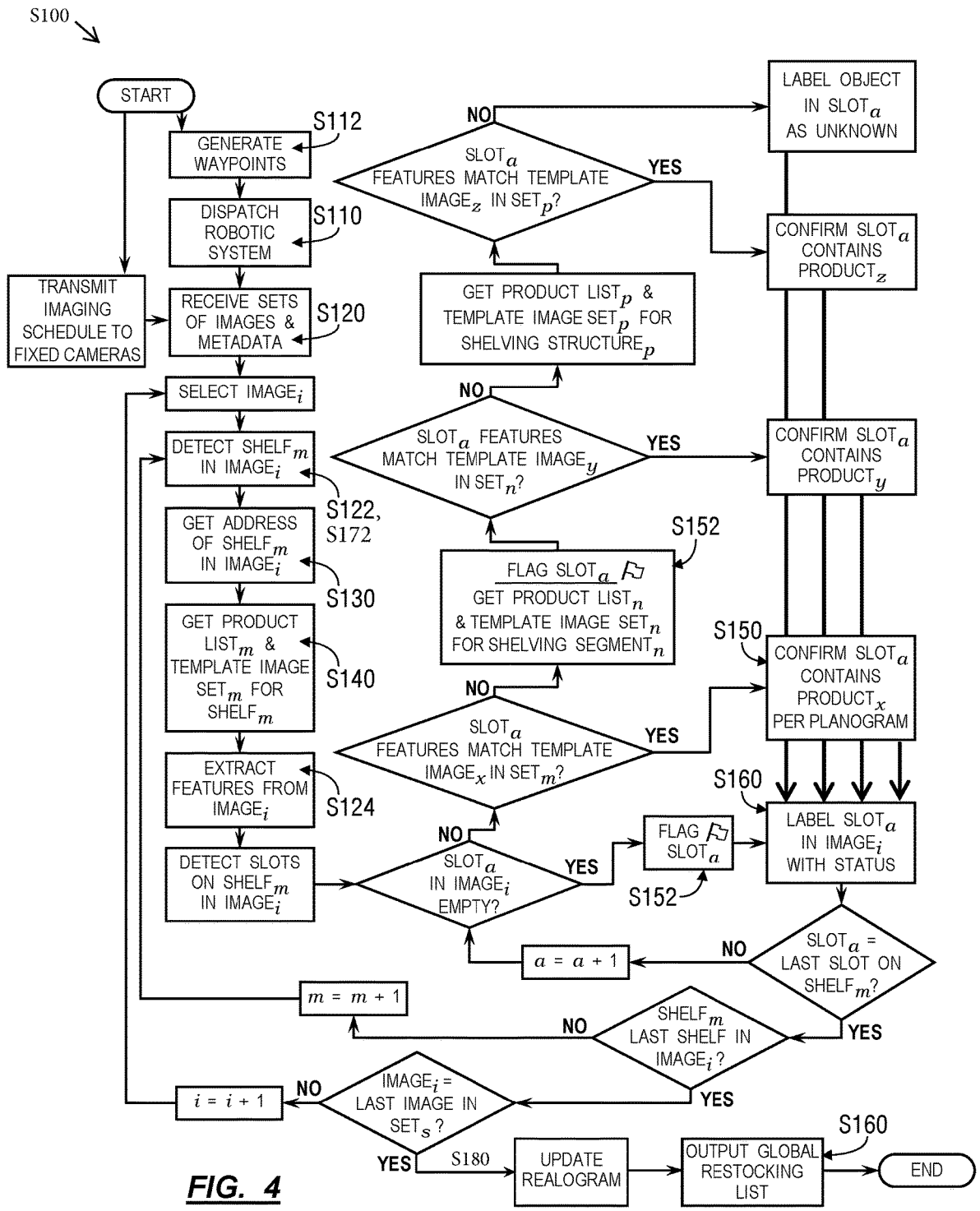
FIG. 4 is a flowchart representation of one variation of the method.

In one variation shown in FIGS. 1 and 4, the method S100 includes Block S122, which recites detecting a first shelf represented proximal a first region of the first image. Generally, in Block S122, the computer system can segment an image (e.g., a corrected image, a composite image cropped around a shelving segment) into regions corresponding to areas or volumes above discrete shelves in a shelving segment represented in this image.

In one example, the computer system implements methods and techniques described above to crop a composite image of all or a portion of a first shelving structure around a first shelving segment. In this example, the computer system then: detects features in the image; extracts—from this set of features—a first linear feature extending laterally across (substantially a full width of) the image; extracts—from this set of features—a second linear feature extending laterally across (substantially the full width of) the image and offset below the first linear feature by a distance approximating a common shelf thickness or a known shelf thickness of shelving structures throughout the store; and correlates the first linear feature and the second linear feature with a first shelf in the first shelving segment—that is, the upper leading edge and the lower leading edge of the first shelf. In this example, the computer system can similarly: extract—from this set of features—a third linear feature extending laterally across the image and offset above the first linear feature; extract—from this set of features—a fourth linear feature extending laterally across the image and offset below the third linear feature by a distance approximating the common or known shelf thickness; and correlate the third linear feature and the fourth linear feature with a second shelf in the first shelving segment above in the first shelf in the first shelving segment.

In the foregoing example, the computer system can then define a first region of the image extending from proximal the first linear feature to proximal the fourth linear feature above and extending across the full width of the image cropped to the width of the first shelving segment. The computer system can thus extract a first region of the first image—cropped or otherwise bounded around the first shelving segment—corresponding to an accessible volume above the first shelf in the first shelving segment in the first shelving structure. The computer system can repeat this process for each other shelf in the first shelving segment and in each other shelving segment throughout the store to generate a set of image regions, each representing an area or volume above one shelf in the store.

The computer system can also implement methods and techniques described below to write an address of a shelf represented in each image region. However, the computer system can implement any other methods or techniques to segment an image of a shelving structure or shelving segment around a single shelf represented in the image.

4.3.3 Object-Based Image Segmentation

The computer system can additionally or alternatively segment an image—such as cropped or bounded around a shelving structure, around a shelving segment, or above a single shelf—by discrete objects detected in the image.

In one example, the computer system implements computer vision techniques to: detect features in a first region of a first image cropped around an area or volume above a first shelf; and to detect a set of discrete objects arranged across the first shelf in the first region of the first image, such as by identifying edge features delineating bounds of each of these objects. The computer system can then: extract a first subregion in the first region of the first image or crop the first region of the first image around a first subregion corresponding to a first discrete object—in the set of discrete objects—shown in a first position on the first shelf in the first image; and repeat this process for other discrete objects detected in the first region of the first image to generate a set of discrete image subregions, each representing one discrete object arranged in a unique location on the first shelf.

Once the computer system crops or bounds a subregion of an image around an object detected in the image, the computer system can implement methods and techniques described below to extract features from this subregion and to then identify this object as a product unit of a particular product type based on correlation between these extracted features and features represented in a product model representing the particular product type.

4.3.4 Slot Segmentation

The computer system can additionally or alternatively segment an image—cropped or otherwise bounded around a shelving structure, shelving segment, or shelf—by individual slots defined within the shelving structure, shelving segment, or shelf.

4.3.4.1 Slot Segmentation by Shelf Tag

In one example, the computer system: implements methods and techniques described above to detect the upper leading edge and lower leading edge of a first shelf in a first image cropped around a first shelving segment; detects features in a section of the first image between the upper leading edge and the lower leading edge of the first shelf; identifies groups of features along this section of the first image as shelf tags affixed to the first shelf; and detects a left edge of each identified shelf tag. For a first region of the first image representing the first shelf in the first shelving segment, the computer system can then associate a subregion of the image 1) extending laterally from the left edge of a first shelf tag to the left edge of a second shelf tag to the right edge of the first shelf tag (or to the right edge of the image) and 2) extending vertically from the upper leading edge of the first shelf to the lower leading edge to a second shelf above (or to the top edge of the image) within a single slot. The computer system can repeat this process for other subregions in the first region of the image to detect multiple discrete slots on the shelf.

In this example, the computer system can also extract relative positions of these shelf tags from this section of the image of the first shelving segment and compare these relative positions to relative slot positions assigned to the first shelf by the planogram in order to confirm that real positions of these shelf tags align to the current stocking plan of the store. In this example, the computer system can define slot positions along the first shelf based on shelf tag locations, as described above, if the number and relative positions of these shelf tags match the planogram; otherwise, the computer system can project slot locations defined in the planogram onto the image of the first shelving segment or onto the first region—in the image—of the first shelf, as described below.

In this example, the computer system can also: read a barcode, extract a SKU or other product identifier, and/or read a price from a first shelf tag detected in the first image; confirm that these data read from the first shelf tag align to data assigned to the adjacent slot (e.g., above and to the right of the first shelf tag) by the planogram. If data read from the first shelf tag align to data specified in the planogram, the computer system can define a first slot position relative to the first shelf tag in the image, as described above, and treat these shelf tag data as ground truth for the slot. Otherwise, the computer system can: implement the planogram as ground truth for the first slot; and flag the first shelf tag for correction in Block S160, such as by projecting slot locations defined in the planogram onto the image to define the first slot, as described below.

4.3.4.2 Slot Segmentation by Slot Dimensions

In another example, the computer system identifies a region in an image corresponding to a slot by automatically delineating regions in the image according to slot dimensions for the shelf, such as stored in a slot index (e.g., a spreadsheet or slot map) or defined by the planogram. In this implementation, the computer system can: retrieve a shelf address—for a shelf in the field of view of the camera that captured the image, as described below—directly from the image metadata (e.g., from the waypoint linked to the image or by referencing the location and orientation of the robotic system when the image was recorded to the planogram); retrieve slot dimensions (e.g., slot widths) and slot positions for slots on the particular shelf by passing the shelf address into a slot index; and map slot dimensions, slot positions, and slot addresses assigned to the shelf onto the image (e.g., onto the first region of the image corresponding to the first shelf). In this example, the computer system can anticipate the vertical position of the particular shelf in the image based on the address of the particular camera, which is linked to the vertical position of the particular camera on the robotic system, and based on the address of the particular shelf, which is linked to a vertical position of the particular shelf in a particular shelving segment of known location within a particular shelving structure in the store. In this example, the computer system can then implement computer vision techniques (e.g., edge detection) to detect the full span of the particular shelf (e.g., a four-foot-long shelf) in the image based on the anticipated vertical position of the particular shelf in the image, map a string of slot widths—defined in the slot index (or planogram)—to the region of the image corresponding to the particular shelf, and thus delineate regions in the image above the particular shelf as distinct slots according to the string of slot widths.

The computer system can thus delineate "slot regions" (e.g., a row of rectangular slot regions) in the image corresponding to predefined slots on a shelf shown in an image. Furthermore, the planogram can assign a SKU to each slot address, and the computer system can project a SKU from the planogram onto a region in the image representing the corresponding slot address.

4.3.4.3 Slot Segmentation by Planogram

In a similar implementation, the computer system can identify a region in the image corresponding to a slot on a shelf represented in the image by mapping a section of a planogram directly to the image and delineating regions of the image according to product facings represented in the planogram. In this implementation, the computer system can: retrieve a shelving structure address and a shelving section address from the image metadata (or from the corresponding waypoint); retrieve a planogram for the shelving structure address; select a region of the planogram corresponding to the shelving segment represented in the image; and then implement computer vision techniques to skew, scale, translate, and/or rotate the selected region of the planogram into alignment with the field depicted in the image, such as by detecting edges in images corresponding to faces of shelves and aligning shelf edges in the planogram to shelf edges detected in the image. The computer system can then segment the image a set of regions depicting individual slots defined in the planogram and write SKUs of product types assigned to these slots in the planogram onto corresponding regions in the image.

4.4. Product Model Selection

Block S130 of the method S100 recites: accessing an address of the first shelf based on the first location, the first orientation, and a vertical position of the first shelf within the first image; and retrieving a first list of product types assigned to the first shelf by a planogram of the store based on the address of the first shelf. Block S140 of the method S100 recites retrieving a first set of product models from a database of product models, wherein each product model in the first set of product models includes visual characteristics of a product specified in the first list of product types. Generally, in Block S130, the computer system identifies an address of a shelf represented in a region of an image and retrieves a list of product types assigned to this shelf; in Block S140, the computer system can retrieve a relatively small subset (e.g., dozens) of product models representative of product types in this list from a large database (e.g., millions) of product models representative of a wide range of products. In particular, in Blocks S130 and S140, the computer system reduces a relatively large database of available product models down to a small set of product models of product types assigned to this shelf—and thereby substantially likely to be present on this shelf—represented in the image. The computer system can then compare features extracted from a region of the image over (or under) the shelf to features in product models in this relatively small set of product models in Blocks S150 and S152 to confirm the presence, absence, and/or orientation of product units assigned to this shelf.

(The computer system can implement similar methods and techniques to: identify an address of a slot, a shelving segment, or a shelving structure represented in an image and to retrieve a list of product types assigned to this slot, shelving segment, or shelving structure in Block S130; retrieve a relatively small set of product models representative of product types in this list from the database of product models in Block S140; and confirm the presence, absence, and/or orientation of product units assigned to this slot, shelving segment, or shelving structure based on correlation between features extracted from the image and features in the set of product models in Blocks S150 and S152.)

4.4.1 Product Model Database

The computer system maintains a database of product models, wherein each product model in the product model database: is associated with an identifier of a product type (e.g., a SKU value); and includes a representation of characteristics of the product type, such as in the form of a (photographic or graphical) template image, a color histogram, text strings, or a barcode or quick-response code value on one or multiple faces of product packaging for the product type.

Each product model in the product model database can also be tagged with a product description, supplier, supply period, graphics release date, secondary graphic, barcode, color palette, packaging profile (e.g., packaging shape and size), and/or other quantitative or qualitative product packaging feature or descriptor. Furthermore, each product model in the product model database can be tagged with a product packaging orientation. For example, for one product associated with a particular SKU and packaged in a six-sided box, the product model database can include: a first product model squarely showing the front (or "primary") face of the box and tagged accordingly; a second product model squarely showing the rear face of the box and tagged accordingly; a third product model squarely showing the right face of the box and tagged accordingly; a fourth product model squarely showing the left face of the box and tagged accordingly; a fifth product model squarely showing the top face of the box and tagged accordingly; and a sixth product model squarely showing the bottom face of the box and tagged accordingly. In this example, the product model database can further include: a seventh product model showing the box angled to evenly expose both the front face and right face of the box and tagged accordingly; an eighth product model showing the box angled to expose the front face, right face, and the top face of the box and tagged accordingly; etc. For each product type represented in the product model database, the product model database can also contain: multiple product models representing a range of lighting conditions on a representative product unit; damaged examples of the product packaging (e.g., dented cans, torn boxes); and/or seasonal product packaging (i.e., product packaging supplied during particular seasons or periods of time); etc.

Additionally or alternatively, product models in the product model database can include multi-dimensional matrices or vectors representative of visual characteristics on product packaging. For example, the computer system can: retrieve a set of multi-dimensional vectors in Block S130, wherein each multi-dimensional vector in this set defines features representative of a product type in a list of product types assigned to a slot, shelf, shelving segment, or shelving structure, etc. When matching a multi-dimensional vector in a set to a product units detected in an image of the slot, shelf, shelving segment, or shelving structure, the computer system can: isolate a first subregion of the image representing a shelf in Block S122; implement computer vision techniques to detect and extract a first set of features—such as including geometry, color, and/or text features—from this first subregion of the image; and calculate a composite score for correlations between first set of features extracted from the first subregion of the image and features defined by a first multi-dimensional vector representative of a first product type; and then identify a first object represented in the first subregion of the image as a product unit of the first product type in Block S150 if this composite score exceeds a threshold score (and vice versa) in Block S152.

However, the product model database can include product models representing characteristics of one or more sides (or "faces") of product types in any other data format.

4.4.2 Product Model Selection by Shelving Structure

In one implementation, the computer system selects a set of product models—from the product model database—representing visual characteristics of product types assigned to slots along the height and length of a shelving structure. In this implementation, the computer system can read a shelving structure address (or "ID") stored in metadata of the image, retrieve the shelving structure address associated with a waypoint (approximately) occupied by the robotic system when the image was recorded, or project the location and orientation of the robotic system when the image was recorded into an architectural plan of the store to determine the address of the shelving structure in Block S130. The computer system can then pass the shelving structure address into the planogram associated with the store to retrieve a list of product types assigned to slots across this shelving structure in Block S130.

The computer system can then retrieve a set of product models—from the database of product models—showing one or more sides of product types in this list in Block S140. For example, a shelving structure within a store can be stocked with 80 unique product facings. In this example, the computer system can: compile a list of 80 unique SKUs designated for stocking on this shelving structure in Block S130 based on the shelving structure address stored in the image metadata and the planogram; and aggregate a set of 80 product models from a database of millions of product models associated with millions of unique product types in Block S140, wherein each selected product model in the set represents a primary face of a packaging (e.g., a front face of a box, bag, can, or bottle, etc.) for one product type in the list of product types associated with the shelving structure address.

In the foregoing example, for the set of 80 unique product types assigned to the shelving structure, the computer system can aggregate 480 product models—from the database of millions of product models—for subsequent comparison to the image, wherein each product model represents one of six sides of a packaging for one product type assigned to the shelving structure, and wherein the set of 480 product models includes one product model of each side of a packaging of each of the 80 product types. Alternatively, the computer system can retrieve—from the product model database—all available product models (or all prioritized or highest-ranking product models) for product types assigned to the shelving structure by the planogram, such as: three product models (e.g., representing visual characteristics of a product type in 0°, 120°, and 240° yaw positions) for a bottled or canned product; two product models (e.g., representing visual characteristics of the front and back faces of a product type) for a bagged product; and six product models (e.g., representing visual characteristics of the front, back, left, right, top, and bottom of the product type) for a boxed product.

The computer system can also prioritize or select product models representing current known packaging designs of product types assigned to the shelf. For example, the computer system can select a set of product models: representing only seasonal product packagings for a current season; or representing both standard product packaging and seasonal product packagings for the current season.

In another example, the computer system can select product models associated with lighting conditions similar to a lighting condition detected in the image or detected at the robotic system when the image was captured.

However, the computer system can selected or filter product models of images retrieved from the product model database by any other parameter in Block S140 in order to accumulate a relatively small set of product models containing (or defining) visual characteristics of product types (i.e., product packagings of known product types) most likely to be located on the shelving structure and detected in the image.

4.4.3 Product Model Selection by Shelving Segment

In another implementation, the computer system selects a set of product models—from the product model database—representing visual characteristics of product types assigned to slots in a single shelving segment within a shelving structure. In this implementation, the computer system can implement methods and techniques described above to access an address of a shelving segment represented in an image in Block S130, such as by: retrieving a shelving segment address associated with a waypoint at which the image was recorded; or querying the planogram or architectural plan of the store for the address of the shelving segment depicted in the image based on the location and orientation of the robotic system at the time the image was recorded. The computer system can then: pass the shelving segment address into the planogram to retrieve a list of product types (e.g., a set of SKUs) assigned to shelves within the shelving segment in Block S130, as described above; and aggregate a relatively small set of product models—from the product model database—containing data (e.g., in image, vector, or matrix format) representing product types in the list of product types assigned to the shelving segment in Block S140.

For example, for a list of 20 product types assigned to a particular shelving segment associated with a particular shelving segment address, the computer system can aggregate 20 product models—from the database of millions of product models—for subsequent comparison to an image of the particular shelving segment in Blocks S150 and S152, wherein each product model represents a primary face of a product packaging for one product type in the list of product types assigned to the particular shelving segment. In this example, the computer system can also aggregate additional product models of product types in this list of product types, such as representing alternate or seasonal product packaging, other sides of product packagings, or damaged product packagings of these product types, as described above.

4.4.4 Product Model Selection by Shelf

In yet another implementation, the computer system selects a set of product models—from the product model database—representing visual characteristics of product types assigned to slots in a single shelf within a single shelving segment in the store. In this implementation, the computer system can: retrieve a shelving segment address, as described above; detect a vertical location of the particular shelf within the shelving segment depicted in the image (e.g., in Block S122); and retrieve an address of the particular shelf based on the shelving segment address and the vertical position of the particular shelf. The computer system can then: pass the shelf address into the planogram to retrieve a list of product types (e.g., a set of SKUs) assigned to the particular shelf in Block S130, as described above; and aggregate a relatively small set of product models—from the product model database—containing data (e.g., an image, vector, or matrix format) representing product types in the list of product types assigned to the particular shelf in Block S140.

For example, for a list of five product types assigned to the particular shelf, the computer system can aggregate a set of five product models for subsequent comparison to the image, wherein each product model in this set of five product models represents a front face of one product type in the list of product types. In this example, the computer system can also aggregate additional product models of product types in this list of product types, such as representing alternate or seasonal product packaging, other sides of product packagings, or damaged product packagings of these products, as described above.

4.4.5 Product Model Selection by Slot

In another implementation, the computer system selects a set of product models—from the product model database—representing visual characteristics of a single product type assigned to a single slot on one shelf within one shelving segment in the store. In this implementation, the computer system can: retrieve an address of a shelf containing the particular slot, as described above; detect a horizontal location of the particular shelf within the shelving segment depicted in the image; and retrieve an address of the particular slot based on the shelf address and the horizontal position of the particular slot along the shelf. In Block S140, the computer system can then: pass the slot address into the planogram to retrieve a SKU of a single product type assigned to the particular slot, as described above; and retrieve a single or a relatively small set of product models—from the product model database—containing data (e.g., in image, vector, or matrix format) representing this single product type assigned to the particular slot.

4.4.6 Product Model Selection by Shelf Tag

In one variation, the computer system: implements computer vision techniques to detect a shelf tag on a shelf within the image; reads a barcode, QR code, SKU, product description, and/or other product identifier in Block S130; selects a set of product models tagged with the same barcode, QR code, SKU, product description, facing count, and/or other product identifier in Block S140; and assigns the set of product models to a slot region in the image proximal (e.g., above) the shelf tag.

In this variation, the computer system can also: read a target product facing count and product identifier directly from the shelf tag; define a slot boundary adjacent the shelf tag, as described above; retrieve a product model for a product type associated with the product identifier; compare visual characteristics defined in the product model to features extracted from a region of the image contained within this slot boundary to calculate a quantity of facings of the particular product type (i.e., a quantity of unobstructed product units of the particular product type) occupying the slot; and then verify the stock condition of the slot if this quantity of facings of the particular product type equals the target product facing count read from the shelf tag.

Alternatively, the computer system can: retrieve stocking requirements for the slot by passing the product identifier and/or a slot address—read directly from the shelf tag—into the planogram; and then verify the stock condition of the slot if the quantity of facings of the particular product type detected in the image equals the target product facing count assigned to the slot by the planogram.

However, the computer system can implement any other methods and techniques to select a relatively small set of product models—from a relatively large set of product models—for comparison to one or more regions (or "slot regions") in the image.

The computer system can therefore aggregate a set of product models—from the product model database—for comparison with the image based on: the position of the robotic system at the time the image was captured; an aisle, a shelving structure, a shelving segment, a shelf, and/or a slot proximal the position of the robot; and SKUs of product types assigned to stocking within this aisle or on this shelving structure, shelving segment, shelf, and/or slot. In particular, the computer system can aggregate a set of product models: corresponding to a single product type assigned to a particular slot; corresponding to multiple product types assigned to slots adjacent (e.g., above, below, and beside) the particular slot; corresponding to multiple product types assigned to a single shelf containing the particular slot; corresponding to multiple product types assigned to a set of shelves around the particular slot; corresponding to multiple product types assigned to multiple shelving segments around the particular slot; and/or corresponding to multiple product types assigned to the shelving structure containing the particular slot and an opposing shelving structure; etc.

In Block S140, the computer system can also assemble this set of product models that represent visual characteristics of multiple sides of their corresponding product types and/or various lighting conditions on these product types.

However, the computer system can implement any other method or technique to link one or more product types to discrete regions in the image, and the computer system can populate a relatively small set of product models—from a relatively large database of product models—in any other way and according to any other parameter detected in the image or defined in the planogram of the store.

4.4.6 Current Planogram

In the foregoing implementations, the computer system can also generate a list of product types in Block S130 and a corresponding set of product models in Block S140 that conform to time constraints for the image.

In one implementation shown in FIG. 1, the computer system: extracts a date and time of the image from a timestamp stored in metadata of the image (or in metadata of the related raw image); selects a planogram current as of the image timestamp; and aggregates a list of product types assigned—to a slot, shelf, shelving segment, or shelving structure, etc. depicted in the image—based on this current planogram. For example, product units in the store may be rearranged or removed and new product units may be added to slots throughout the store over time, such as in preparation for an upcoming holiday, in anticipation of seasonal changes, etc., such as on a daily, weekly, monthly, quarterly, or annual basis, and these changes may be defined across a set of planograms for the store. The computer system can therefore aggregate a list of product types (e.g., SKUs) assigned to a particular slot, shelf, shelf segment, or shelving structure, etc. by a current planogram in Block S130 in order to accommodate such daily, weekly, monthly, quarterly, annual, scheduled, and unscheduled changes to assigned locations of product types throughout the store.

Similarly, in Block S140, the computer system can select product models current to the time the image was recorded (e.g., current to the timestamp stored in the image metadata). For example, for each product type specified in the list of product types generated in Block S130, the computer system can aggregate a set of product models representing both the current (e.g., "newest," latest) product packaging and a most-recent obsolete product packaging of the product type in Block S140. In this example, for a particular product type assigned to a slot represented in a region of the image, the computer system can: prioritize comparison of this region of the image to a current product model representing a current packaging design of the particular product type; and then compare this region of the image to a previous product model representing a last obsolete packaging design of this particular product type if the computer system fails to match to the product model of current the packing design to this region of the image. The computer system can therefore aggregate both current and outdated product models in Block S140 in order to support detection of current and outdated (e.g., "expired") product packagings in Block S150.

4.5. Product Identification and Stock Condition

Block S150 of the method S100 recites confirming presence of a product unit of a first product type, in the first list of product types, on the first shelf in Block S150 in response to detecting correlation between features in the first set of features and visual characteristics defined in a first product model representing the first product type. Generally, in Block S150, the computer system detects the presence of a product unit of a particular product type on a particular shelf or in a particular slot by matching features in a product model associated with the particular product type to features extracted from a region of the image depicting this particular shelf or slot. The computer system can then confirm that the presence and location of the particular product unit aligns with stocking requirements assigned to this product type by the planogram.

Similarly, Block S152 of the method S100 recites determining that a product unit of the first product type is improperly stocked on the first shelf in response to deviation between features in the first set of features and features in the first product model. Generally, in Block S152, the computer system determines that a particular slot is empty of product, contains a product that is misoriented, contains an incorrect product type, or has otherwise deviated from stocking requirements specified in the planogram based on a difference between features extracted from a region of the image corresponding to this slot and visual characteristics represented in a product model of a product type assigned to this slot. In particular, the computer system can execute Blocks S150 and S152 to verify: whether a product unit of an assigned product type is present in a slot; whether a primary packing face of the product unit is facing outwardly from the slot (i.e., whether the product is properly oriented in the slot); whether the product unit is upright; whether the product unit is located near a target depth on the slot (e.g., within a threshold distance of the face of the adjacent shelf); whether the product unit is damaged; whether the correct quantity of facings of the product type are present in the slot; and/or whether product packagings of these product units are current; etc.

4.5.1 Feature Matching

In one implementation, the computer system implements template matching techniques to compare regions (or subregions) of an image to a set of product models representing a set of product types specifically assigned to a slot, shelf, shelving segment, or shelving structure depicted in the image. For example, the computer system can: segment an image by shelf; extract a first region of the image corresponding to a first shelf depicted in the image; crop the first region around objects shown on the first shelf (i.e., remove a background area from the first region); and implement edge detection, object detection, or other computer vision techniques to identify discrete subregions in the first region of the image, wherein each subregion represents a single object (e.g., a single unit of a product type) arranged on the first shelf. (In this example, the computer system can also project a slot dimension defined in the planogram for the first shelf onto the first region of the image to inform or guide detection of discrete objects on the first shelf.) The computer system can then implement template matching techniques to compare each subregion of the first region of the image to product models in the set of product models selected for the first shelf until a match is found or until the set of product models is exhausted for each subregion.

In the foregoing example, the computer system can also: extract a predominant color, a representative spectrum of relative color values, or a histogram of pixel colors from a first subregion of the image depicting an object; and then rank, prioritize, or filter the set of product models for comparison to the first subregion according to similarities between the predominant color or a representative spectrum of relative color values in the product models and the first subregion of the image. Additionally or alternatively, the computer system can: extract a histogram of pixel color values from the first subregion of the image depicting the object; and identify this object as a product unit of a particular product type in response to this histogram of pixel color values approximating a product model defining a template histogram of pixel color values representative of this particular product type.

Similarly, the computer system can implement optical character recognition, object detection, or other computer vision techniques to extract text and/or an object geometry from the first subregion of the image. The computer system can then rank, prioritize, or filter the set of product models for comparison to the object the first subregion of the image according to similarities between the extract text or object geometry and text strings or product packaging geometries represented in these product models.

However, the computer system can rank, prioritize, or filter the set of product models for comparison to the first subregion of the image based on any other feature read or extracted from the first subregion of the image. The computer system can then systematically compare product models—of product types assigned to the first shelf—to the first subregion of the image according to rank or priority until a match is found or until the set of product models is exhausted for the first subregion. The computer system can repeat this process for each other subregion in the first region of the image.

Furthermore, in this example, the computer system can calculate a score (e.g., a "confidence score," a "similarity score") for a match between a subregion of the image and a product model in the set of product models representing product types assigned to the first shelf, such as proportional to a number of matched features occurring in similar relative positions in the subregion and the product model. For example, the computer system can: calculate a similarity score between a first subregion in the image and each product model in the set of product models of product types assigned to the first shelf; identify an object represented in the first subregion as a first product in response to the similarity score between the first subregion and a first product model—representing the first product type—exceeding all other similarity scores for product models in the set and exceeding a preset threshold similarity score. In particular, in the foregoing implementations, the computer system can identify a discrete object represented in a first subregion of the image as a product unit of a first product type in Block S150 in response to relatively strong correlation between features extracted from the first subregion of the image and features represented in a first product model representing the first product type. The computer system can then tag the first subregion of the image with a SKU or other identifier of a product unit depicted by the first product model. Furthermore, if the first product model is tagged with additional data, such as packaging side, packaging orientation, product description, supplier, supply period, graphics release date, packaging damage, etc. of the first product type, the computer system can also copy these data (e.g., in the form of tags or image metadata) to the first subregion of the image depicting the object thus identified as a product unit of the first product type.

However, if the computer system fails to calculate a similarity score—for similarity of the first subregion of the image to a product model of the particular product type assigned to the corresponding slot on the shelf—that exceeds the threshold similarity score, the computer system can determine that no product unit of the particular product type was present in this slot at the time the image was captured. The computer system can then: flag the first subregion of the image for comparison to a larger set of product models of product types assigned to other slots, shelves, shelving segments, and/or shelving structures nearby; and/or flag the corresponding slot for restocking with product units of the particular product type.

Alternatively, the computer system can: scan a first product model—in the set of product models—across the width and height of the first region of the image; calculate a best position, orientation, and a similarity score for the first product model across the first region of the image; repeat this process for each other product model in the set; and then tag discrete subregions in the first region of the image with product identifiers from product models exhibiting greatest similarity scores over a threshold similarity score, as shown in FIG. 1. The computer system can thus tag or associate discrete subregions of the first region of the image with product identifiers from product models matched (e.g., exhibiting greatest similarity scores over a threshold similarity score) to these subregions in Block S150. In this implementation, if the computer system fails to calculate a similarity score between the first subregion of the image and a product model in the set that exceeds the threshold similarity score, the computer system can determine that no product type represented in the set of product models is stocked on the first shelf or properly oriented on the first shelf in Block S152. Furthermore, if the computer system detects features representative of other than a bare shelf in a subregion of the image untagged or unmatched to a product model in the set, the computer system can flag this subregion of the image for comparison to a larger set of product models of product types assigned to other slots, shelves, shelving segments, and/or shelving structures nearby.

Therefore, in the foregoing implementations, the computer system can implement template matching, edge detection, pattern matching, pattern recognition, optical character recognition, color recognition, content-based image retrieval, pose estimation, code reading, shape recognition, and/or any other suitable method or technique to detect an object in a region of the image and to match this object to visual characteristics represented in a product model associated with a particular product type. The computer system can repeat this process to match product models—in the set of product model for other product types assigned to the same shelf, shelving segment, or shelving structure, etc.—to other objects detected in the image and to label these other objects with product data from these matched product models.

The computer system can also store types, locations, and orientations of product unit detected in the image a realogram representing the slots, shelves, shelving segments, shelving structures, and/or other inventory structures depicted in the image. For example, the computer system can transform subregions in the image in which discrete objects are detected and matched to product models into a realogram of slot containers on one or more shelves depicted in the image, wherein each slot container is labeled with a product identifier (e.g., SKU), a packaging side, a packaging orientation, and/or other data extracted from a product model matched to the corresponding region in the image and whether an object is detected in the corresponding subregion of the image. Alternatively, in the variation described above in which the computer system delineates subregions in the image depicting discrete slots based on a slot index the planogram, etc.) prior to comparing subregions of the image to product models, the computer system can generate a realogram of slot containers for each slot depicted in the image based on the slot index (or the planogram, etc.); when a region in the image is matched to a product model in Block 150, the computer system can then copy product data from the product model into the corresponding slot container in the realogram. The computer system can also flag a slot container in the realogram as empty, containing an incorrect product type in Block S152 if the computer system fails to identify features—in a region of the image depicting this slot—that are analogous to a product model of the product type assigned to this.

However, the computer system can represent types, locations, orientations, and/or other descriptors etc. of product units detected in the image in any other format.

4.5.2 Product Orientation

Figure 2:
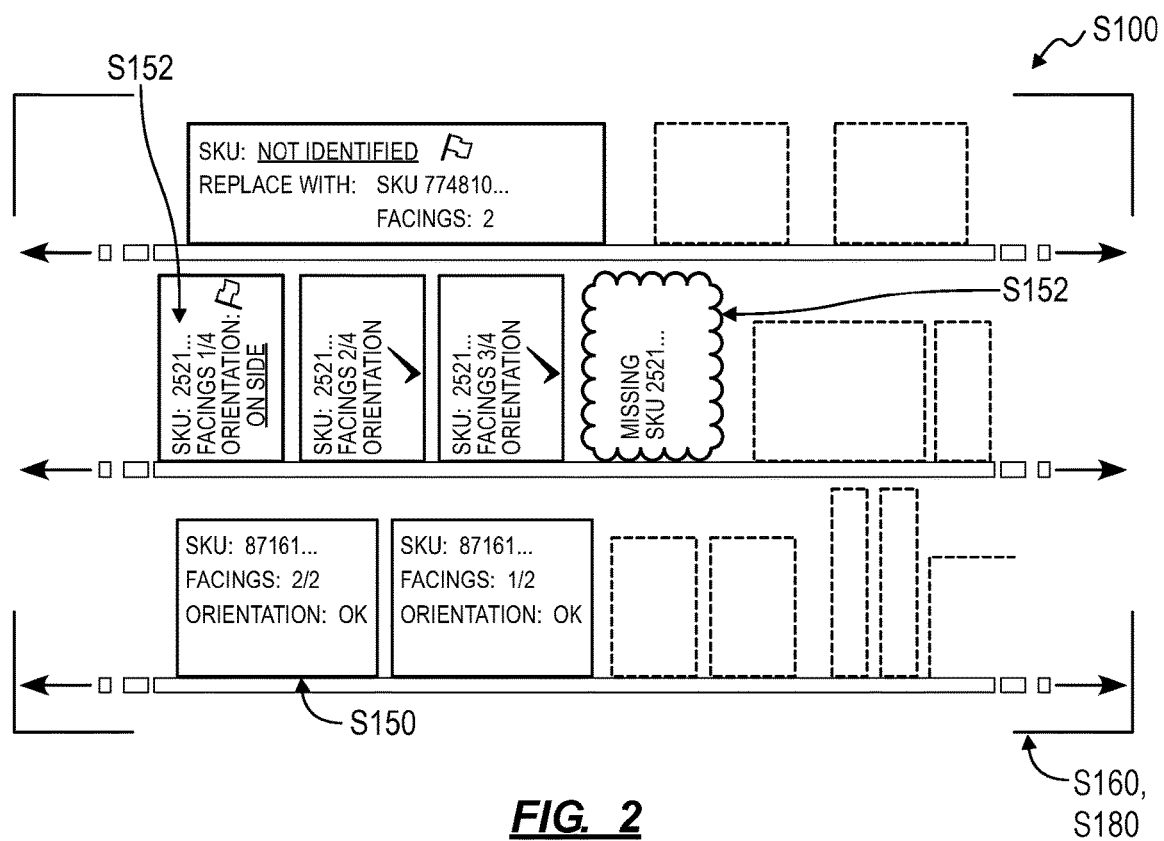
FIG. 2 is a graphical representation of one variation of the method.

In one variation shown in FIGS. 1 and 2, the computer system also estimates an orientation of a product unit identified in a subregion of an image. The computer system can then store the detected orientation of this product unit in its corresponding slot container in the realogram in Blocks S150 and S152, as described above, and write a flag to this slot container if the orientation differs from an acceptable orientation range defined by the planogram.

In one implementation, the computer system: matches features—detected in an region of the image depicting an object—to visual characteristics defined in a product model tagged with a first orientation of a product type; thereby identifies this object as a product unit of the product type; and then writes this first orientation to a representation of this product unit in a corresponding slot container in the realogram in Block S180. In another implementation, the computer system: matches features—detected in an region of the image depicting an object—to visual characteristics defined in a product model depicting a nominal or target orientation of a product type; thereby identifies this object as a product unit of this product type; calculates a transform that maps these visual characteristics to corresponding features in the region of the image; calculates an orientation of object (e.g., an angular offset from the nominal or target orientation) based on this transform; and then writes this orientation to a representation of this product unit in a corresponding slot container in the realogram in Block S180.

In the foregoing implementations, the computer system can then generate a restocking prompt to correct orientation of the product unit if this calculated or estimated orientation of the product unit differs from a target orientation (e.g., 0°) or target orientation range (e.g., +/−10°) assigned to the product type or to the corresponding slot by the planogram. However, the computer system can implement any other method or technique to calculate or estimate the orientation of a product unit of a product type on a shelf in Block S1150 based on visual data contained in an image.

4.5.3 Lateral Product Unit Position

In another variation, the computer system calculates a lateral position of a product unit on a shelf and identifies discrepancies between this lateral position of the product unit and a position of a slot assigned to the corresponding product type by the planogram. The computer system can then store the detected lateral position of this product unit in its corresponding slot container in the realogram in Blocks S150 and S152 and/or write a flag to this slot container in the realogram if this lateral position deviates from (e.g., falls outside of) the bounds of the slot.

In one implementation, the computer system: implements methods and techniques described above to detect a first shelf tag in an image; defines a boundary of a first slot in the image relative to the position of the first shelf tag; and confirms the lateral position of a product unit of a product type—assigned to the first slot—based on a proportion of features representative of this product unit contained within the boundary of the first slot. For example, the computer system can: identify a first shelf tag proximal a bottom edge of a first region of an image representing a first shelf; detect an object on the shelf proximal the first shelf tag; identify the first object as a product unit of a first product unit on the first shelf in Block S150, as described above; extract a horizontal distance from a left vertical edge of the first shelf tag to a left vertical edge of the first product unit; and then determining that the first product unit is misoriented on the first shelf if this horizontal distance exceeds a threshold distance (e.g., a default threshold distance of a threshold distance specified by the planogram). In particular, the computer system can confirm that the left edge of a product unit of a product type detected on a shelf aligns to a left edge of a nearest shelf tag (or a shelf tag specifying the same product type)—within a preset tolerance—and otherwise flag the product unit as misoriented on the shelf.

In another implementation, the computer system confirms the lateral position of a product unit of a first product type based on: the relative distance of the product unit from a second product unit of a second product type type detected on the same shelf; and a target distance between these product types assigned to the shelf by the planogram. For example, the computer system can: detect a set of discrete objects arranged across a first shelf represented in a first region of an image; identify a first subregion in the first region of an image corresponding to a first discrete object in the set of discrete objects; extract a first set of features from the first subregion in the first region of the first image; and identify the first discrete object as a product unit of a first product type, in the first list of product types, in response to correlation between features in the first set of features and visual characteristics defined in a first product model representing the first product type in Block S150. The computer system can repeat this process to identify a second discrete object, in the set of discrete objects, as a product unit of a second product type in response to correlation between features in a second set of features—extracted from a second subregion in the first region of the image—and visual characteristics defined in a second product model representing the second product type. Once units of the first and second product types are identified in the image, the computer system can detect improper arrangement of the first product unit and the second product unit on the first shelf if a lateral offset between a first position of the first product unit and a second position of the second product unit on the first shelf deviates from a target lateral offset assigned—by the planogram—to the first product type and the second product type for the first shelf.

In the foregoing implementations, if the computer system determines that a lateral position of a product unit of a product type relative to a corresponding shelf tag exceeds a preset tolerance in Block S152, the computer system can generate a restocking prompt to correct the orientation of the product unit on the shelf in Block S160. For example, the computer system can generate a restocking prompt specifying correction of relative positions of the first product unit and the second product unit in Block S160 in response to detecting improper arrangement of the first product and the second product on the first shelf in Block S150.

However, the computer system can detect incorrect lateral arrangement of product units on shelves in any other way.

4.5.4 Confirm Facing Count

In yet another variation shown in FIGS. 1 and 2, the computer system: counts an existing quantity of product facings of a particular product type detected on a shelf (or in a slot) depicted in the image; compares this existing quantity of product facings of the particular product type on the shelf (or in a particular slot) to a target quantity of product facings of this particular product type assigned to the shelf (or to the particular slot) by the planogram; and writes flags to corresponding slot containers in the realogram if the existing quantity of facings of the particular product type differ from the target quantity of facing of the particular product type specified by the planogram for this shelf (or slot).

In one example, the computer system: implements methods and techniques described above to confirm presence of a set of discrete product units of a first product type detected in a first region of an image corresponding to a first shelf in Block S150 (e.g., in response to discrete clusters of features in a set of features extracted from the first region of the image exhibiting strong correlation to visual characteristics defined in a first product model representing the first product type); generates a count of product units of the first product type detected on the first shelf; confirms proper stocking of the first product on the first shelf if the count equals a quantity of facings of the first product type assigned to the first shelf by the planogram. However, in this example, the computer system can: detect improper stocking of the first product type on the first shelf if this the count deviates from the quantity of facings of the first product type assigned to the first shelf by the planogram; and then generate a restocking prompt that specifies correction of facings of the first product type on the first shelf in response to detecting improper stocking of the first product type on the first shelf.

However, the computer system can implement any other method or technique to count product facings on a shelf shown in an image and to handle deviations between actual and target product facings specified in the planogram.

4.5.5 Packaging Variations

In another variation, the computer system identifies a product packaging of a product unit on a shelf, confirms that the product unit is of a product type assigned to the shelf or slot, and then determines whether this product packaging fulfills requirements defined by the planogram.

In one implementation, the computer system identifies a first object detected in a first subregion of an image as a product unit of a first product type by matching features represented in the first subregion of the image with a first product model of a first product type in a known packaging variation and then compares the known packaging variation represented by the first product model to the planogram to confirm whether the first product unit fulfills stocking requirements defined by the planogram. For example, the computer system can: extract a first set of features from a subregion of an image corresponding to a first slot on a first shelf represented in the image in Block S124; identify a first product type assigned to the first slot by the planogram in Block S130; retrieve a first product model of the first product type in a current packaging and a second product model representing the first product type in a previous packaging; confirm presence of a product unit of the first product type, in the current packaging, in the first slot in response to correlation between features in the first set of features and features in the first product model; and confirm presence of the first product unit, in the previous packaging, in the first slot in response to correlation between features in the first set of features and features in the second product model. In this example, the computer system can then generate a restocking prompt to replace the first product unit in the previous packaging with a product unit of the first product type in the current packaging (and to dispose of the first product unit in the previous packaging) in response to confirming presence of the first product unit in the previous packaging on the first shelf.

The computer system can therefore: determine whether a product unit of a particular product type is present in an assigned slot on a shelf and confirm that this product unit is packaged according to a current packaging variation designated for the particular product type in Block S150; and otherwise flag the slot or product unit for correction. In particular, the computer system can accommodate changes to product packagings over time, such as seasonal product packaging changes, and implement the foregoing methods and techniques to confirm that product units stocked throughout the store are packaged according to current packaging variations specified or allowed by the planogram.

Furthermore, in this variation, the computer system can confirm that a first object detected in a first subregion of an image is of a product unit of a first product type based on sufficient similarity between features extracted from the first subregion and features represented in one of more product models of the first product type despite the first product unit in the first subregion of the image representing a packaging variation (e.g., a new packaging variation) other than those represented in product models of the same product type retrieved in Block S130. For example, the computer system can predict presence of a product unit of the first product type, in a new packaging, on the first shelf in response to: similarities between features (e.g., text, graphics, barcodes, color palettes, packaging profiles) extracted from the first subregion and defined in a first product model representing the same product type in a different packaging; similarities between features extracted from the first subregion and defined in a second product model representing the same product type in another packaging; and detection of features in the first subregion of the image that are unique to both the first product model and the second product model. In this example, the computer system can then: store the subregion of the first region of the first image corresponding to the detected the first product unit as a new product model representing the first product type in the new packaging; and write the new product model to the database of product models for future comparison to images of shelves assigned the first product type by the planogram.

In the foregoing example, the computer system can also flag the first subregion of the image for manual annotation or confirmation of the product unit as an instance of first product type in the new product packaging. The computer system can additionally or alternatively: generate a prompt to supply a stock image of the first product type in the new packaging; and return this prompt to an associate of the store or to a brand or supplier of the first product type in order to enable identification of units of the first product type in the new product packaging in subsequent images of this inventory structure.

4.5.6 Empty Slot

In yet another variation shown in FIG. 4, the computer system can detect an "empty" slot devoid of product units.

In one implementation, the computer system: identifies a region of an image depicting a slot designated for stocking with a first product type by the planogram in Block S122; and implements object detection techniques to detect absence of objects within this subregion of the image. The computer system can then annotate a corresponding slot container in the realogram as "empty" in Block S180 and generate a restocking prompt to fill this slot with a number of units of the product type—specified in the planogram— accordingly in Block S160.

4.5.7 Other Product Units

The computer system can repeat the foregoing processes to detect and identify product units of the same and other product types in other slots depicted in the same image and in other images captured by the robotic system during the scan cycle. The computer system can then update slot containers in the realogram to reflect the types, locations, and/or orientations of product units occupying corresponding slots throughout the store.

4.5.8 Slot Status

The computer system can also label each slot container in the realogram as one of: properly stocked responsive to alignment in the lateral position, depth, and vertical rotation of an object matched to a product model of a product type assigned to the slot; properly stocked but misoriented responsive to detection of an object matched to a product model of a product type assigned to the slot concurrent with deviation of the object from a lateral position, depth, or vertical rotation tolerance specified by the planogram; properly stocked but in incorrect packaging responsive to detection of an object matched to a product model of a product type—in known incorrect (e.g., former, outdated) product packaging—assigned to the slot by the planogram; improperly stocked responsive to detection of an object not identified or matched to a product model of a product type not assigned to the slot by the planogram; or empty responsive to failure to detect an object in the region of an image representing the slot. In this example, the realogram can mimic a form of the planogram but define a (approximately) true current stock state of the store. Alternatively, the realogram can be in the form of a spreadsheet, stock list (e.g., by slot address), etc. containing slot state data extracted from images recorded by the robotic system during a scan of the store.

However, the computer system can implement any other methods or techniques to identify real deviations from stocking requirements defined in a planogram, or slot index, etc. for the store.

4.6. Product Model Set Escalation

In one variation in FIG. 4, if the computer system detects an object in a subregion of an image but fails to identify a product model that matches the object with a sufficient similarity score, the computer system escalates a set of product models retrieved from the product model database to include product models of product types assigned to a single shelf, then to multiple shelves within a single shelving segment, then to multiple shelving segments within a single shelving structure, and then to multiple shelving structures within a single aisle, etc. in Block S130. In particular, the computer system can grow a set of product models—for comparison to a particular object detected in a particular subregion of an image—as this set of product models representing product types predicted to most likely match the particular object fail to return positive results (i.e., positive matches) in order to: maintain a relatively high degree of efficiency in identifying product units arranged on shelves throughout a store; while also accommodating deviations from a stocking plan defined by a planogram, such as due to patrons removing product units and then returning these product units to incorrect locations throughout the store or due to intentional or unintentional stocking changes executed by associates of the store.

For example, a patron may remove an item (i.e., a product unit of a product type) from a shelf, inspect the item, and then return the item to the same shelf or to a different shelf nearby. In another example, a patron may remove an item from a shelf, place the item in her basket, move down the same aisle, and then return the item—such as in favor of another item—to a shelf on a different shelving segment in the same shelving structure or even the opposing shelving structure. As described above, the computer system aggregates small sets of product models representing product types assigned to singular shelves (or even singular slots) in order to achieve a relatively high degree of accuracy in product model selection and relatively rapid identification of a large proportion (e.g., 95+%) of product units on shelves throughout the store. However, because patrons may move product units throughout the store while shopping, the computer system can also expand a set of product models to include product types assigned to multiple shelves, a whole shelving segment, multiple shelving segments, a complete shelving structure, two adjacent shelving structures, etc. in order to accommodate these unplanned, incidental stocking changes by patrons and to enable identification of product units that may have been moved relatively short distances from their assigned slots based on strategic, targeted sets of product models.

4.6.1 Escalation to Shelving Segment

In one implementation, the computer system: identifies a first shelf, a first shelving segment containing the first shelf and a second shelf, a first shelving structure containing the first shelving segment and a second shelving segment, and a first aisle facing the first shelving structure and a second shelving structure in Block S122, as described above; identifies a first subregion in the first region of the first image corresponding to a first slot on the first shelf assigned a first product type by the planogram in Block S122; extracts a first set of features from the first subregion of the first image in Block S124; retrieves a first set of product models or product types assigned to the detects presence of an object in the first slot based on the first set of features in Block S150; and then identifies the object as other than a product type in the first list of product types in response to weak correlation (e.g., less than a threshold similarity) between the first set of features and features in product models in the first set of product models.

In this implementation, if the computer system detects presence of the object in the first slot and identifies the object as other than a product type in the first list of product types assigned to the first shelf, the computer system can: retrieve a second list of product types assigned to the first shelving segment—containing the first shelf and additional shelves and/or slots—by the planogram in Block S130; remove product types in the first list of product types from the second list of product types; and retrieve a second set of product models from the database of product models, wherein each product model in the second set of product models includes visual characteristics of a product type specified in the second list of product types in Block S140. The computer system can then implement methods and techniques described above to identify the object as a product unit of a second product type, in the second list of product types, in Block S150 in response to correlation between features in the first set of features and features in a second product model, in the second set of product models, representing the second product type. Thus, if the computer system identifies the object as a product unit of the second product type, the computer system can generate a prompt to replace the second product unit—currently occupying the first slot—with a product unit of the first product type in Block S160.

In particular, the computer system can expand a set of product models—for comparison to a subregion of an image representing a detected object—from product models of product types assigned to a single shelf containing the detected object to a complete shelving segment (or multiple shelves within the shelving segment) if the original set of product models of product types assigned to the shelf exclusively fails to yield a sufficient match to the subregion of the image representing the object.

4.6.2 Escalation to Shelving Structure

Alternatively, in the foregoing implementation, the computer system can identify the object as other than a product type in the second list of product types (i.e., not a product type assigned to the shelving segment containing the first shelf) in Block S152 in response to weak correlation between the first set of features extracted from the first subregion of the image and features in product models in the second set of product models of product types assigned to the first shelving segment. Thus, in response to identifying the object as other than a product type in the second list of product types, the computer system can: retrieve a third list of product types assigned to the first shelving structure—containing the first shelving segment and additional shelving segments, shelves, and/or slots—by the planogram in Block S130, wherein the third list of product types excludes the first list of product types and the second list of product types; and retrieve a third set of product models from the database of product models in Block S140, wherein each product model in the third set of product models includes visual characteristics of a product type specified in the third list of product types. The computer system can then identify the object as a product unit of a third product type, in the third list of product types, in Block S150 in response to correlation between features in the first subset of features and features in a third product model, in the third set of product models, representing the third product type. Thus, if the computer system identifies the object as a product unit of the third product type, the computer system can generate a prompt to replace the unit of the third product type—currently occupying the first slot—with a product unit of the first product type.

In particular, the computer system can expand a set of product models—for comparison to the subregion of the image representing the detected object—from product models of product types assigned to a single shelving segment containing the detected object to a complete shelving structure (or multiple shelving segments within the shelving structure) if the previous set of product models of product types assigned to the shelving segment exclusively fails to yield a sufficient match to the subregion of the image representing the object.

4.6.3 Escalation to Aisle

Alternatively, in the foregoing implementation, the computer system can identify the object as other than a product type in the third list of product types (i.e., not a product type assigned to the shelving structure containing the first shelving segment) in Block S152 in response to weak correlation between the first set of features extracted from the first subregion of the image and features in product models in the third set of product models of product types assigned to the first shelving structure. Thus, in response to identifying the object as other than a product type in the third list of product types, the computer system can: retrieve a fourth list of product types assigned to the first aisle—containing the first shelving structure and additional shelving structures, shelving segments, shelves, and/or slots—by the planogram in Block S130, wherein the fourth list of product types excludes the first, second, and third lists of product types; and retrieve a fourth set of product models from the database of product models in Block S140, wherein each product model in the fourth set of product models includes visual characteristics of a product type specified in the fourth list of product types. The computer system can then identify the object as a product unit of a fourth product type, in the fourth list of product types, in Block S150 in response to correlation between features in the first subset of features and features in a fourth product model, in the fourth set of product models, representing the fourth product type. Thus, if the computer system identifies the object as a product unit of the fourth product type, the computer system can generate a prompt to replace the unit of the fourth product type—currently occupying the first slot—with a product unit of the first product type.

In particular, the computer system can expand a set of product models—for comparison to the subregion of the image representing the detected object—from product models of product types assigned to a single shelving structure containing the detected object to a complete aisle (or multiple shelving structures within the aisle) if the previous set of product models of product types assigned to the shelving structure exclusively fails to yield a sufficient match to the subregion of the image representing the object.

The computer system can repeat this process to expand the set of product models to product types assigned to shelving structures in multiple aisles, to shelving structures in a section of the store, or to the entire store over time until a match is found or until a limit is reached, such as: a maximum time allotted to identify the object in the first slot; a maximum product model set size; etc.

In this variation, the computer system can implement static limits for ceasing identification attempts for objects in all slots throughout the store. Alternatively, the computer system can implement custom or dynamic limits for ceasing identification attempts for objects in all slots throughout the store. For example, the computer system can set limits proportional to margin, demand, value to the store (e.g., a linear combination of margin and demand), cost, etc., such as described in U.S. patent application Ser. No. 15/347,684.3.

However, the computer system can implement any other methods or techniques to select and expand a set of product models for comparison to a region or subregion of an image in Blocks S150 and S152.

5. Fixed Camera

A fixed camera can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and a housing configured to contain the optical sensor, the motion sensor, the processor, the wireless communication module, and the battery and configured to mount to a surface within the field of view of the optical sensor intersecting an area of interest within the store (e.g., a shelf below, a shelving segment on an opposite side of an aisle).

The optical sensor can include: a color camera configured to record and output 2D photographic images; and/or a depth camera configured to record and output 2D depth images or 3D point clouds. However, the optical sensor can define any other type of optical sensor and can output visual or optical data in any other format.

The motion sensor can include a passive infrared sensor that defines a field of view that overlaps the field of view of the optical sensor and that passively outputs a signal representing motion within (or near) the field of view of the optical sensor. The fixed camera can transition from an inactive state to an active state on a regular interval (e.g., once per hour), on a regular schedule (e.g., proportional to historical patron occupancy in the store), when triggered by the robotic system, and/or responsive to an output from the motion sensor indicating motion in the field of view of the motion sensor. Once in the active state, the fixed camera can trigger the optical sensor to record an image (e.g., a 2D color photographic image), and the wireless communication module can then broadcast this image to a wireless router in the store. Alternatively, the fixed camera can store this image in a local memory (e.g., a buffer), and the wireless communication module can wirelessly transmit images from the buffer to the robotic system when requested by the robotic system during a next scan cycle (e.g., when the robotic system navigates to a location near the fixed camera during this next scan cycle).

The optical sensor, motion sensor, battery, processor, and wireless communication module, etc. can be arranged within a single housing configured to install on an inventory structure—such as by adhering or mechanically fastening to a shelf face or surface within a shelving segment or mounting to an inventory structure via a stalk, as shown in FIG. 1—with the field of view of the optical sensor facing a shelf below, an adjacent slot, or a shelving segment on an opposing side of an aisle in the store, etc.

In one variation described below, the fixed camera includes a wireless energy harvesting and/or a wireless charging subsystem configured to harvest energy from a signal broadcast by the robotic system during a scan cycle (or broadcast by another fixed or mobile transmitter nearby). However, this fixed camera can define any other form and can mount to a surface or inventory structure in any other way.

5.1 Fixed Camera Installation

An operator or technician, etc. may install and orient a population of fixed cameras throughout the store: to image all inventory structures throughout the store (e.g., with a minimum field between adjacent fixed cameras of view overlap of 10% at a vertical shelf face plane); or to image select sections of particular inventory structures throughout the store (e.g., up to twenty shelving segments stocked with highest-value products and/or least accessible to the robotic system). The operator or technician may then: connect these fixed cameras to a wireless network in the store or to a network bus via a physical link; and then link these fixed cameras to a store account assigned to the store.

For example, the operator or technician may install low-density fixed cameras per slot throughout the store, such as with each fixed camera defining a field of view that spans an entire shelving segment containing multiple slots (e.g., rather a single slot or single shelf). The computer system can then leverage the planogram and product identification pipeline described above and below to identify types and orientations of products occupying slots depicted as relatively low object-level resolutions in images captured by these fixed cameras.

The operator or technician may then manually populate a map of the store with locations and orientations of these fixed cameras, such as within the coordinate system of the store.

5.1.1 Automatic Fixed Camera Localization

In one variation, the remote computer system automatically calculates locations of (or "localizes") fixed cameras installed in the store based on alignment between: product units detected in images received from these fixed cameras; and locations of product types represented in an existing planogram or realogram of the store.

In one implementation, the remote computer system implements methods and techniques described above to transform a set of images recorded by the robotic system during a last scan cycle into a realogram in Block S180. Upon receipt of a set of images recorded by a fixed camera recently installed in the store, the remote computer system: selects a particular fixed camera image with a timestamp nearest a time of the last robotic system scan cycle; detects products in the particular fixed camera image; generates a list of product types depicted in the particular fixed camera image; and scans the last realogram of the store for an inventory structure containing every product type in the list. The remote computer system can then associate this fixed camera with a single contiguous inventory structure section stocked with a greatest number (and more than a minimum proportion, such as 90%) of products on this list.

In a similar implementation, the remote computer system can: access an image captured by a fixed camera; execute methods and techniques described above to identify a constellation of product units from the particular fixed camera image; scan the planogram (or an existing realogram) of the store for a contiguous inventory structure section containing a nearest approximation of product types in this constellation of product units; and then associate this fixed camera with this contiguous inventory structure section. Furthermore, in this implementation, the remote computer system can: calculate a transform that projects and aligns this constellation of product units extracted from this fixed camera image onto corresponding product types represented in the planogram (or existing realogram) of this inventory structure section; and estimate a location and orientation of the fixed camera in the store based on this transform and a known location and orientation of this inventory structure section within the store.

The computer system can similarly calculate a field of view of the fixed camera—within a coordinate system of the store—based on the known location and orientation of this inventory structure section within this coordinate system and a segment of the inventory structure detected in this fixed camera image.

In the foregoing implementation, the remote computer system can further limit or prioritize a search for alignment between products detected in the particular fixed camera image and products depicted in the realogram: to inventory structures near locations of fixed cameras previously recommended to the operator or technician, as described above; and/or to inventory structures near the location of the robotic system upon receipt of these particular fixed camera images from the fixed camera.

In the foregoing implementations, the remote computer system can implement similar methods and techniques to compare products detected in the particular fixed camera image: directly to images recorded by the remote computer system (e.g., when occupying locations or waypoints near a location at which the robotic system received this particular fixed camera image); or to products depicted in the planogram of the store.

Therefore, the remote computer system can identify a location of the fixed camera, the field of view of the fixed camera, and/or the inventory structure segment (and therefore shelving structure, shelving segment, shelf, and/or slot identify) that falls in the field of view of the fixed camera. The remote computer system can also label this inventory structure segment (or shelving structure, shelving segment, shelf, and/or slot specifically)—represented in the planogram or other representation of the store—with a unique identifier (e.g., a UUID) of this fixed camera.

The remote computer system can repeat this process for each other fixed camera deployed in the store in order to automatically configure these fixed cameras.

5.2 Fixed Camera Image Scheduling and Access

Figure 5:
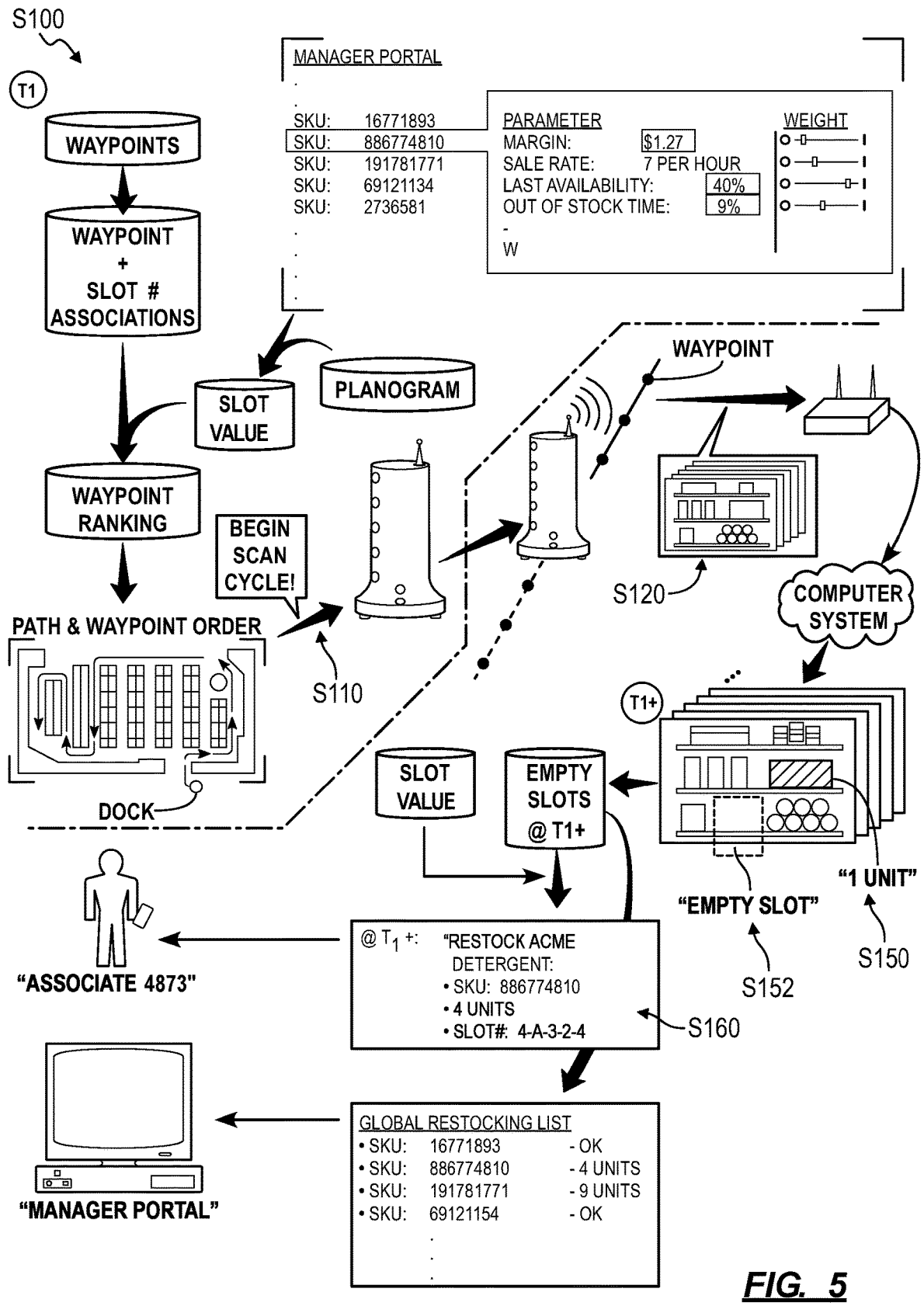
FIG. 5 is a flowchart representation of one variation of the method.

Once deployed, these fixed cameras can record images and return these images—labeled with timestamps and fixed camera identifiers—to the remote computer system (e.g., via the wireless network), such as on a regular interval of once per minute or once per hour, as shown in FIGS. 1 and 5.

Additionally or alternatively, a fixed camera thus installed in the store can include a motion sensor defining a field of view intersecting the field of view of the camera. For example, throughout operation, the fixed camera can: set an imaging flag in response to detecting motion in a field of view of the first fixed camera at a first time; and then clear the imaging flag, capture an image of its adjacent inventory structure, and transmit the image to a remote computer system (e.g., via a local wireless network) in response to detecting absence of motion in its field of view (e.g., via the motion sensor) for a threshold duration of time succeeding the first time.

In a similar example, the fixed camera can: include a motion sensor defining a field of view that intersects the field of view of the camera; regularly sample or read outputs of this motion sensor; and detect motion in the field of view of the camera based on outputs of the motion sensor. Then, in response to detecting cessation of motion in the field of view of the camera, the fixed camera can set a timer for a delay duration (e.g., two seconds). In response to expiration of the timer, the fixed camera can capture a photographic image of the adjacent inventory structure. (Alternatively, the fixed camera can capture a photographic image of the adjacent inventory structure immediately in response to detecting cessation of motion in the field of view of the camera.) The fixed camera can then compare this photographic image to a last photographic image captured by the robotic system and sent to the computer system. In response to detecting a difference between the current photographic image and the previous photographic image, the fixed camera can transmit the current photographic image to the computer system (e.g., via a wireless network or local area network) for processing; otherwise, the computer system can discard the current photographic image.

Yet alternatively, once these fixed cameras are connected to the remote computer system, the remote computer system can set and upload image capture schedules to these fixed cameras. For example, the remote computer system can specify an image capture frequency for a particular fixed camera proportional to composite imaging values (or product values more specifically, or monitoring frequencies) of slots that fall in the field of view of this fixed camera.

The remote computer system can then store these fixed camera images and process these images as described below in preparation for combination with data received from the robotic system during a next scan cycle after installation of these fixed cameras. In particular, upon receipt of this image, the remote computer system can: detect an object in the image; identify the object as a product unit of a particular product type; update the realogram to reflect presence of the product unit in a particular slot in this inventory structure; read a target product type assigned to the particular slot by the planogram; and then serve a prompt to a computing device affiliated with a store associate to restock the slot in the first inventory structure in response to the product type deviating from the target product.

5.2 Fixed Camera Image Access Via Robotic System

In one variation, for a fixed camera not connected to the wireless network in the store, not connected to fixed electrical infrastructure, and/or outfitted with a lower-power wireless communication module, the fixed camera can: capture and store images locally; and then offload these images to the robotic system when the robotic system navigates near the fixed camera during scan cycles.

In one implementation, once deployed, these fixed cameras: record images on a fixed interval or schedule; and store these images in local memory (e.g., buffer) until a next scan cycle executed by the robotic system. When executing a scan cycle following installation of these fixed cameras, the robotic system can regularly broadcast a query for fixed camera images. Upon receipt of this query from the robotic system, a fixed camera can transmit a batch of images stored in local memory to the robotic system and then clear these images from its local memory. The robotic system can then: tag these fixed camera images with the location of the robotic system in the store at time of receipt; and upload these fixed camera images (now labeled with timestamps, fixed camera identifiers, and approximate fixed camera locations in the store) to the remote server for processing, such as in real-time or upon completion of the scan cycle.

For example, a first fixed camera—in a number of fixed cameras installed in the store—can record a first image of a first inventory structure in the store and store this first image of the first inventory structure in local memory. During a later or concurrent scan cycle, the robotic system can: navigate proximal the first inventory structure; query the fixed camera for images stored in memory; download the first image from the first fixed camera; navigate proximal a second inventory structure scheduled for imaging by the robotic system; record a second image of the second inventory structure; and transmit the first image and the second image to a remote computer system. Upon receipt of these images from the robotic system, the remote computer system can: detect a first product unit in the first image; identify a first product type of the first product unit detected in the first image; detect a second product unit in the second image; identify a second product type of the second product unit detected in the second image; and calculate a stock condition of the store during this scan cycle based on the first product type detected in the first inventory structure and the second product type detected in the second inventory structure.

Alternatively, upon receipt of a query from the robotic system, a fixed camera can capture an image, tag this image with a timestamp and fixed camera identifier, and transmit this image back to the robotic system. The robotic system can then: tag this fixed camera image with the location of the robotic system at time of receipt from the fixed camera; and upload this fixed camera image to the remote server.

However, the remote computer system can access a set of fixed camera images from these fixed cameras in any other way following installation of these fixed cameras in the store.

5.3 Imaged Inventory Structure Segment

Blocks S170 and S172 of the method recite: retrieving a geometry of a field of view of the fixed camera at the first time; and estimating a segment of an inventory structure in the store depicted in the photographic image based on a projection of the geometry of the field of view onto a planogram of the store. Generally, in Blocks S170 and S172, the computer system can automatically identify a segment of an inventory structure depicted in an image captured by the fixed camera and thus identify a constellation of slots and product types assigned to this inventory structure segment by the planogram. For example, the computer system can execute Blocks S170 and S172 in order to automatically accommodate for: a (confirmed or unknown) change in the position or orientation of the fixed camera relative to the inventory structure; reorganization of inventory structures throughout the store; and/or unknown shifts in positions of inventory structures throughout the store.

In one implementation, the computer system executes Blocks S170 and S172 to identify the inventory structure segment depicted in the image: upon receipt of a first image from the fixed camera after the fixed camera is installed in the store; or upon manual confirmation (e.g., from an operator or technician) that inventory structures in the store were recently moved. Additionally or alternatively, the computer system can: detect a constellation of inventory structure features in an image received from the fixed camera; compare this constellation of inventory structure features detected in this image to a constellation of inventory structure features detected in a previous image received from the fixed camera; and then execute Blocks S170 and S172 to identify the inventory structure segment depicted in the image in response to detecting a difference between these constellations of inventory structure features. Yet alternatively, the computer system can automatically execute Blocks S170 and S172 for each image received from the fixed camera.

In the foregoing implementations, the computer system can access a stored location and an orientation of the fixed camera within a coordinate system of the store at the time the image was recorded, such as stored in a map manually populated with fixed camera positions or containing fixed camera positions derived automatically from features detected in previous images received from the camera, as described above. The computer system can then: calculate a position of a focal axis of the fixed camera within the coordinate system of the store based on the location and the orientation of the fixed camera within the coordinate system; retrieve imaging properties (e.g., camera field of view angle, image sensor width, and image sensor height) of the fixed camera, such as based on a known type or class of the fixed camera; and calculate a volumetric imaging boundary extending along the focal axis of the fixed camera based on the imaging properties of the fixed camera. The computer system can thus store this volumetric imaging boundary as a geometry of the field of view of the fixed camera referenced to the coordinate system of the store. The computer system can then: access a current inventory structure plan defining target locations of inventory structures within the coordinate system of the store; project the volumetric imaging boundary of the fixed camera onto this current inventory structure plan; and derive a boundary around an inventory structure—defined in the current inventory structure plan—that intersects this projected volumetric imaging boundary (i.e., the field of view) of the fixed camera. The computer system can then port this inventory structure boundary onto the planogram to define a particular segment of the inventory structure within the field of view of the fixed camera when the image was captured. Alternatively, the computer system can: project the volumetric imaging boundary of the fixed camera directly onto a 3D planogram—referenced to the coordinate system of the store; and directly calculate the segment of the inventory structure in the field of view of the fixed camera at the time the image was captured based on an intersection of the projected volumetric imaging boundary and a volumetric representation of this inventory structure in the planogram.

In another implementation shown in FIG. 6, the computer system: implements computer vision techniques to isolate a region of the image depicting an inventory structure; implements methods and techniques similar to those described above to detect a set of inventory structure features (e.g., aisle numbers, quick-response codes on shelving segments, barcodes on tops of inventory structure) in this region of the photographic image; and identifies a set of inventory structures (e.g., a particular shelving structure or shelving segment) depicted in the photographic image based on these inventory structure features. In this implementation, the computer system can then: retrieve locations and orientations of this set of inventory structures within a coordinate system of the store; and calculate a field of view of the fixed camera within the coordinate system of the store based on locations and orientations of the set of inventory structures within the coordinate system of the store and based on positions of the set of inventory structure features in the photographic image. The computer system can also project this field of view of the fixed camera onto the 3D planogram in order to locate—in the planogram—a boundary around a segment of an inventory structure visible to the fixed camera and thus depicted in this image.

Yet alternatively, the computer system can access a predefined or stored boundary around the inventory structure segment visible to this fixed camera and thus depicted in this image.

However, the computer system can implement any other method or technique to identify an inventory structure or inventory structure segment depicted in this image captured by the fixed camera.

5.4 Structure-Wide Product Unit Identification

After identifying an inventory structure or inventory structure segment depicted in this image, the computer system can identify a set of product types assigned to this inventory structure segment, such as to particular shelves or individual slots in this inventory structure segment.

In one implementation, the computer system: queries the planogram for a list of product types currently assigned to all slots in (and around) the inventory structure segment depicted in the image; retrieves a corpus of product models for this list of product types; isolates a region of the image depicting the inventory structure segment (e.g., by projecting a boundary around the inventory structure from the planogram back onto the image or by implement computer vision techniques to identify a boundary around the inventory structure segment); and detects a population of objects within this region of the image. The computer system then compares each of these objects to product models—in the corpus of product models—as described above until: the computer system positively identifies every object as a product unit of one product type in the list; and/or until all unidentified objects have been compared to all product models in this corpus and thus identified as other than a product type assigned to this inventory structure segment by the planogram.

For example, the computer system can implement computer vision techniques (e.g., object detection, object recognition, template matching) to detect: the segment of the inventory structure in a region of the photographic image; and a set of objects in this region of the photographic image. For a first object in this set of objects, the computer system can then: extract a constellation of features from a subregion of the image depicting the object; select a first product model of a first product type in the list of product types assigned to the inventory structure segment; and identify the object as a product unit of the first product type in response to the constellation of features approximating a first set of visual characteristics represented in the first product model. However, if this constellation of features differs from the first set of visual characteristics represented in the first product model of the first product type, the computer system can: identify the object as a product unit of other than the first product type; select a second product model of a second product type in the list of product types assigned to the inventory structure segment; and identify the object as a product unit of the second product type in response to the constellation of features approximating a second set of visual characteristics represented in the second product model. However, if this constellation of features differs from the second set of visual characteristics represented in the second product model of the second product type, the computer system can repeat this process until the computer system: positively identifies the first object based on alignment (e.g., correlation in excess of a similarity threshold) between this constellation of features and visual characteristics represented in another product model in this set; or confirms that the product unit is not a product unit of a product type assigned to this inventory structure segment responsive to failure to match this constellation of features to visual characteristics represented in any product model in this set. The computer system can then repeat the process for each other object in the set of objects detected in the region of the image depicting the inventory structure segment.

The computer system can then write the types and locations (and, quantities, orientations, etc.) of product units—detected in the region of the image depicting the inventory structure segment—to a representation of this inventory structure segment in the realogram.

5.5 Slot-Bounded Product Unit Identification

Alternatively, the computer system can: delineate individual slots depicted in the image; query the planogram for product types assigned to these individual slots; retrieve product models for these product types; and compare objects detected in these slots to product models of their assigned product types, as shown in FIG. 6.

5.5.1 Slot Boundary Defined in Planogram

In one implementation shown in FIG. 6, the computer system: calculates a transform that maps the inventory structure segment detected in the image into a corresponding inventory structure segment represented in the planogram; extracts a map of slot boundaries in this inventory structure segment from the planogram; and projects this map of slot boundaries back onto the image based on the transform. However, the computer system can implement any other method or technique, such as described above, to locate a slot boundary from the planogram onto the image of this inventory structure segment.

For each slot boundary thus projected onto the image, the computer system then: detects a set of objects in a region of the image bounded by the slot boundary; retrieves a product model of the product type assigned to this slot by the planogram (or a set of product models representing different faces or orientations of this product type); and compares each of these objects to the product model (or set of product models) of this product type to confirm whether these objects are product units of the product type assigned to this slot.

5.5.2 Slot Boundary Defined by Shelf Tag

In a similar implementation, the computer system: detects a set of shelf tags in the image; locates slot boundaries over the image based on locations of the shelf tags, such as described above; and links these slot boundaries to product type assigned to these slots by the planogram. For example, the computer system can: calculate a transform that maps the inventory structure segment detected in the image into a corresponding inventory structure segment represented in the planogram; extract a map of product type identifiers—assigned to slots in this inventory structure segment—from the planogram; project this map of product type identifiers back onto the image based on the transform; and link each product type identifier to a nearest slot boundary defined over the image.

For each slot boundary, the computer system then: detects a set of objects in a region of the image bounded by the slot boundary; retrieves a product model of the product type linked to this slot boundary (or a set of product models representing different faces or orientations of this product type); and compares each of these objects to the product model (or set of product models) of this product type to confirm whether these objects are product units of the product type assigned to this slot.

However, the computer system can implement any other method or technique, such as described above, to locate a slot boundary over the image of this inventory structure segment based on locations of shelf tags detected in this image.

Then, in this and the foregoing implementations, the computer system can calculate a position of each product unit (e.g., centroids or boundaries of each product unit) relative to its slot boundary defined over the photographic image. The computer system can then: flag an individual slot if the position of a product unit—assigned to this individual slot—falls partially or fully outside of the slot boundary assigned to the product type of this product unit; and distribute a prompt to a store associate to reorganize product units on this flagged slot.

5.5.3 Incorrect Product Type

Furthermore, in response to detecting a difference between an object within a slot boundary defined on the image and a product model of a product type assigned to this slot, the computer system can: retrieve a set of product models of other product types assigned to other nearby slots in the inventory structure; and compare this object to this set of product models in order to positively identify this object, as described above. The computer system can therefore detect presence of a product unit of the second product type occupying a slot in the inventory structure segment, wherein the second product type differs from a first product type assigned to this slot. Accordingly, the computer system can: represent presence of this product unit of the second product type—occupying the slot—in the realogram; and flag the second product unit for removal from the slot responsive to the planogram assigning the first product type—different from the second product type—to this slot.

5.5.4 Missing Product Type

Furthermore, in the foregoing implementations, the computer system can record locations of each identified (and unidentified) product unit and count total quantities of product units of each product type identified in this region of the image. If a total quantity of product units of a particular product type thus identified in the image is less than a target quantity of this product type assigned to this inventory structure segment by the planogram, the computer system can flag this segment of the inventory structure (or a particular slot in this inventory structure allocated for stocking with the particular product type) for restocking with product units of the particular product type. For example, if the total quantity of product units of the particular product type thus identified in the image equals a null value (e.g., if a subset of product units identified as the particular product type equals a null set), the computer system can flag this segment of the inventory structure (or a particular slot in this inventory structure allocated for stocking with the particular product type) for restocking with a total quantity of product units of the particular product type assigned to this inventory structure segment (or the particular slot more specifically) by the planogram. Similarly, if the total quantity of product units of the particular product type thus identified in the image is greater than the target quantity of this product type assigned to this inventory structure segment by the planogram, the computer system can flag this segment of the inventory structure for inspection and rearrangement.

For example, in the implementation described above in which the computer system defines slot boundaries over the inventory structure segment depicted in the image, the computer system can scan a region of the image—contained within a slot boundary—for a set of objects. Then, in response to detecting absence of objects within this region of the image bounded by this slot boundary, the computer system can: write an out-of-stock condition to a representation of the corresponding slot in the realogram; and flag this slot in the inventory structure for restocking with product units of the product type assigned to the slot by the planogram.

5.5.5 Product Orientation

As described above, the computer system can also derive an orientation of a product unit on the inventory structure segment. For example, the computer system can: isolate a region of the image corresponding to a slot in the inventory structure segment; query the planogram for a product type assigned to this slot; and retrieve a set of product models of the product type, including a first product model representing a first set of visual characteristics of a first packaging face (e.g., a front) of the particular product type and a second product model representing a second set of visual characteristics of a second packaging face (e.g., a side) of the particular product type. The computer system can then: extract a first constellation of features of a first object within this region of the image; identify this first object as a first product unit of the particular product type—in a first orientation—occupying the slot in response to this first constellation of features approximating the first set of visual characteristics represented in the first product model; and represent presence of this first product unit—in the first orientation and occupying this slot—in the realogram. Similarly, the computer system can: extract a second constellation of features of a second object within this region of the image; identify this second object as a second product unit of the particular product type—in a second orientation—occupying the slot in response to this second constellation of features approximating the second set of visual characteristics represented in the second product model; and represent presence of this second product unit—in the second orientation and occupying this slot—in the realogram. If this second orientation deviates from a target orientation of the particular product type, the computer system can also flag the second product unit and generate a prompt to rearrange the second product unit in this slot of the inventory structure.

5.6 Shelf Tag Validation

In one variation, the computer system implement methods and techniques described above to detect a shelf tag in a region of the image and to read a product identifier from this region of the image. The computer system can the retrieve a product model associated with this product identifier (such as if a confidence score for the product identifier read from this region of the image exceeds a threshold confidence) and then implement methods and techniques described above to verify that an object in an adjacent slot in the inventory structure segment is a product unit of the corresponding product type if features representative of this object align with visual characteristics represented in this product model.

In the variation, the computer system can additionally or alternatively implement methods and techniques described above: to confirm alignment between the product identifier read from the shelf tag and the product type assigned to the corresponding slot by the planogram; and then flag this shelf tag in response to detecting alignment between the product identifier read from the shelf tag and the product type assigned to the slot by the planogram.

Alternatively, the computer system can detect a shelf tag in a region of the image, but the resolution of the shelf tag may be insufficient to read a product identifier (e.g., a SKU value, a barcode) from a region of the image with more than a threshold confidence. Therefore, in this variation, the computer system can: interpret a range of possible product identifiers from features detected in this image; confirm that a product type assigned to the corresponding slot is associated with a product identifier in this range of possible product identifiers; and flag the shelf tag for inspection if the product type assigned to the corresponding slot is associated with a product identifier not found in this range of possible product identifiers. Additionally or alternatively, the computer system can flag the shelf tag for inspection if this range of possible product identifiers excludes a product type of a product unit detected in an adjacent slot in the image.

For example, the computer system can: detect a first shelf tag in the image received from the fixed camera; locate a first slot boundary around a first slot, depicted in the photographic image, according to a position of the first shelf tag in the photographic image; and interpret a set of possible product identifiers from the first shelf tag, including "01234-021-F10-6," "81234-021-F10-8," "01234-821-F18-6," and "0L234-02L-F10-6," etc. The computer system can also retrieve a product identity of a product type assigned to the first slot, such as including "01234-021-Fl0-6." The computer system can then: flag the first shelf tag for inspection in response to the set of possible product identifiers excluding the product identifier of the product type assigned to the slot; or confirm accuracy of the shelf tag in response to the set of possible product identifiers including the product identifier of the product type assigned to the slot.

5.7 Other Fixed Cameras

The computer system can repeat the foregoing methods and techniques to interpret stock conditions of inventory structure segments generally—and slots more specifically—depicted in images captured by other fixed cameras arranged throughout the store. For example, these fixed cameras can be arranged through the store such that fields of view of adjacent fixed cameras do not overlap at planes passing through shelf faces of nearest inventory structures in the store. Accordingly the computer system can repeat the foregoing methods and techniques to detect types, locations, and orientations, etc. of product units on individual inventory structure segments depicted in images received from individual fixed cameras throughout the store.

Alternatively, for a set of fixed cameras defining fields of view that intersect at planes passing through shelf faces of a nearest inventory structure, the computer system can stitch (approximately) concurrent images received from these fixed cameras into one composite image and then execute methods and techniques described above to detect and identify types, locations, and orientations, etc. of product types in slots depicted in this composite image.

5.7.1 Fixed Camera/Robotic System Coordination

In the foregoing variation, a set of fixed cameras can be arranged within the store such that each fixed camera faces a particular inventory structure and defines a field of view that is disjoint from (i.e., does not intersect) a field of view of any other at fixed camera at a plane intersecting shelf faces of this particular inventory structure. In this variation, the computer system can implement methods and techniques described above to: deploy the robotic system to capture images of sections of the inventory structure not imaged by these fixed cameras; derive stock conditions of slots depicted in these images captured by the robotic system; and to store these stock conditions in the realogram.

For example, the computer system can: access a third image depicting a third segment of an inventory structure—between two segments of the inventory structure imaged by these fixed cameras—and captured by the robotic system while executing a scan cycle; read a product identifier of a third product type from a shelf tag detected in this third image; retrieve a third product model representing a third set of visual characteristics of this third product type; locate a third region in the third image depicting a third slot in this third segment of the inventory structure based on the shelf tag detected in the third image; extract a third constellation of features from this third region of the third image; and detect presence of a third product unit of the third product type occupying this third slot in this third segment of the inventory structure during the scan cycle in response to this third constellation of features approximating the third set of visual characteristics represented in the third product model. The computer system can then store presence of a first product unit occupying a first segment of the inventory structure depicted in a first image captured by a first fixed camera in this set, presence of a second product unit occupying a second segment of the inventory structure depicted in a second image captured by a second fixed camera in this set, and presence of the third product unit occupying the third segment of the inventory structure in the realogram.

6. Output

Block S160 of the method S100 recites, in response to determining that the first product unit is improperly stocked on the first shelf, generating a first restocking prompt for the first product unit on the first shelf. Generally, in Block S160, the computer system serves a stock condition of one or more slots, shelves, shelving segments, shelving structures, etc. within the store to an entity associated with the store, such as including a prompt to manually correct presence, positions, and/or orientations of product units on shelves throughout the store responsive to detected deviation from the current planogram of the store.

6.1 Realogram

In one implementation shown in FIGS. 2 and 6, the computer system outputs the realogram containing slot state data of (substantially) all slots in the store imaged by the robotic system during a scan and/or by fixed cameras during operation. For example, the stock mat can include one 2D overlay for each shelving structure within the store, wherein each 2D overlay defines a vectorized line map delineating discrete slots in the shelving structure, containing a numerical indicator of a proportion of total product facings (e.g., ½, 50%) assigned to each slot in the shelving structure, and color-coded flags for empty, under-stocked, improperly stocked, and misoriented product facings in slots in the shelving structure. The computer system can align these 2D overlays over panoramic images of corresponding shelving structures and then serve these composite images to an associate (or a manager, corporate representative) through a manager portal, thereby enabling the associate to view both real visual data of the store and quantitative and qualitative stock data extracted from these visual data, as shown in FIG. 4.

6.2 Global Restocking List

The computer system can additionally or alternatively generate an global restocking list containing a filtered list of slots in need of correction throughout the store, such as addition of product units, exchange of product units, or rearrangement (or "straightening") of product units. For example, the computer system can generate a stock condition graph, table, or list of improperly-stocked slots throughout the store, such as including a mis-stocking mode (e.g., too many facings, too few facings, misoriented packaging, damaged packing, outdated packaging, etc.) for each improperly-stocked slot in this list, as shown in FIGS. 2 and 4. In this implementation, the computer system can serve this graph, table, or list to the manager of the store via a manager portal, such as executing on a desktop computer, a laptop computer, a tablet, or a smartphone, etc.

The computer system can also generate a stocking correction task list to correct improperly-stocked slots. In this implementation, the computer system can generate a prioritized list of tasks to move misplaced product units, to restock empty or improperly-stocked slots, etc. and then serve this task list to an associate (e.g., employee) of the store via a native stocking application executing on a mobile computing device (e.g., a tablet, a smartphone) carried by the associate. In this implementation, the computer system can implement methods and techniques described in U.S. patent application Ser. No. 15/347,689 to prioritize this list of tasks to correct improperly-stocked slots throughout the store.

In one example, the computer system: detects omission of a first product entirely from a first slot on a first shelf in the store in Block S152; retrieves a first number of units of the first product type assigned to the first slot by the planogram; generates a notification specifying an identifier (e.g., a SKU) of the first product type, the number of units of the first product type assigned to the first slot, a location of the first slot on the first shelf, and a location of the first shelf within the store; and then transmits the notification to a mobile computing device assigned to an associate of the store substantially in Block S160. In this example, the computer system can transmit the notification to the associate in real-time, such as if the first product unit is a high-value product type determined to be empty during a high-traffic period at the store. Alternatively, the computer system can delay transmission of the notification to the associate until the robotic system completes a scan of the store, a full stock state of the store is determined from these scan data, and a list of restocking prompts is ordered according to values of these under- or mis-stocked product units.

In this implementation, the computer system can receive inputs from the associate through the native stocking application to close tasks, and the computer system can later confirm that these tasks were properly closed based on images collected by the robotic system during the next scan cycle within the store. However, the computer system can output stock condition data in any other format in Block S160.

6.3 Accommodating Out-of-Stock Product Types

In Block S160, the computer system can also selectively deactivate or discard restocking prompts based on current availability of units of product types needed to fulfill these restocking prompts. In particular, if the computer system determines that a particular slot is under-, improperly-, or mis-stocked, the computer system can interface with a back-of-store inventory manager to determine whether additional units of a product type assigned to the particular slot are currently available; if so, the computer system can serve a restocking prompt for the slot to an associate of the store; otherwise, the computer system can discard the restocking prompt.

Furthermore, if additional units of a first product type assigned to a slot in the store by a planogram are not currently available, associates or managers of the store may move units of a second product type that is available into this slot. Though deviating from the planogram, the slot may thus be filled by units of the second product unit, which may be (visually and monetarily) more desirable than the slot remaining empty. Therefore, the computer system can accommodate this manual change in real-time by detecting a product unit of the second product type in the slot assigned the first product type, checking that the first product type is not currently in-stock at the store, and temporarily updating the planogram to assign the second product type to the slot until the additional units of the first product type are made available at (i.e., delivered to) the store. In this example, the computer system can also implement methods and techniques described above to detect a shelf tag adjacent the slot, confirm that the shelf tag corresponds to the second product type, and accommodate temporary reassignment of the second product type to the slot pending a match between the second product type and the adjacent shelf tag.

For example, in response to identifying an object represented in a region of an image as a product unit of the second product type rather than a product unit of a first product type assigned to the corresponding slot, the computer system can access available inventory of units of the first product type at the store. Upon confirming lack of availability of additional units of the first product type at the store, the computer system can: withhold the prompt to replace the second product unit—currently occupying the first slot—with a product unit of the first product type; and temporarily reassign the second product type to the first slot, in replacement of the first product, in the planogram.

6.4 Prompting Transfer of Product Units to an Assigned Slot

In the implementation described above in which the computer system detects a product unit of second product type in a first slot assigned a first product type by the planogram, the computer system can: scan the planogram for a second slot nearest the first slot and assigned the second product type; and then generate a second prompt to move the second product unit from the first slot to the second slot. Thus, in this implementation, the computer system can fuse planogram deviations detected across multiple slots throughout the store into a revised (e.g., refined) set of prompts or tasks that enable associates of the store to restock slots and to redistribute on-floor product units to their assigned slots with improved efficiency. For example, the computer system can: serve—to an associate of the store—a first prompt to replace the second product unit currently stored in the first slot with a product unit of the first product type; and pair the first prompt with a second prompt to return the second product unit to a nearest slot assigned the second product type and currently under-stocked.

The computer system can repeat the foregoing methods and techniques during each scan cycle executed by the robotic system and/or for each image received from fixed camera in the store. For example, the computer system can repeat the foregoing methods and techniques after scan cycles performed by the robotic system every night after the store closes in order to generate a stock condition map and a stocking correction task list before the store opens the following morning.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing an image captured by an optical sensor, arranged within a store, at a first time;
   detecting a segment of an inventory structure in the store in a first region of the image;
   identifying a set of slots within the segment of the inventory structure;
   accessing a first product model representing a first set of visual characteristics of a first product type assigned to a first slot, in the set of slots, by a graphical representation of the store;
   detecting a first set of features in a subregion of the image;
   detecting presence of a first product unit of the first product type occupying the segment of the inventory structure at the first time in response to the first set of features approximating the first set of visual characteristics;
   detecting a first shelf tag in the image;
   interpreting a set of possible product identifiers from the first shelf tag; and flagging the first shelf tag for inspection in response to the set of possible product identifiers excluding a first product identifier of the first product type.

2. The method of claim 1:
further comprising:
   accessing a location and an orientation of the optical sensor within a coordinate system of the store at the first time;
   retrieving a set of imaging properties of the optical sensor;
   calculating a position of a focal axis of the optical sensor within the coordinate system of the store based on the location and the orientation of the optical sensor within the coordinate system;
   calculating a volumetric imaging boundary extending along the focal axis of the optical sensor based on the set of imaging properties of the optical sensor; and
   storing the volumetric imaging boundary as a geometry of the field of view of the optical sensor at the first time; and
wherein detecting the segment of the inventory structure in the store in the first region of the image comprises:
   projecting the volumetric imaging boundary onto the graphical representation referenced to the coordinate system of the store; and
   calculating the segment of the inventory structure based on an intersection of the volumetric imaging boundary and a representation of the inventory structure in the graphical representation of the store.

3. The method of claim 1, further comprising:
detecting a set of inventory structure features in the image;
identifying a set of inventory structures depicted in the image based on the set of inventory structure features;
retrieving locations and orientations of the set of inventory structures within a coordinate system of the store;
calculating a field of view of the optical sensor within the coordinate system of the store:
   based on locations and orientations of the set of inventory structures within the coordinate system of the store; and
   based on positions of the set of inventory structure features in the image; and
wherein detecting the segment of the inventory structure in the store in the first region of the image comprises:
   retrieving a geometry of the field of view of the optical sensor at the first time;
   projecting the geometry of the field of view onto the graphical representation of the store referenced to the coordinate system of the store; and
   calculating the segment of the inventory structure in the store based on an intersection of the geometry of the field of view and a representation of the inventory structure in the graphical representation of the store.

4. The method of claim 1, further comprising:
extracting a slot boundary of a second slot, in the set of slots, in the segment of the inventory structure from the graphical representation of the store, the graphical representation corresponding to a target stock condition of the store;
projecting the second slot boundary onto the image;
retrieving a second product model representing a second set of visual characteristics of a second product type assigned to the inventory structure by the graphical representation of the store;
detecting a second object within the second slot boundary in the image;
detecting a second set of features from a second subregion of the image depicting the second object;
detecting presence of a second product unit of the second product type occupying the second slot in the inventory structure at the first time in response to the second set of features approximating the second set of visual characteristics; and
flagging the second product unit for removal from the second slot in the inventory structure in response to the second product type deviating from a third product type assigned to the second slot in the inventory structure by the graphical representation of the store.

5. The method of claim 4, further comprising:
extracting a second slot boundary of a second slot, in the set of slots, in the segment of the inventory structure from the graphical representation of the store;
projecting the second slot boundary onto the image; and
in response to detecting absence of objects within the second slot boundary in the image:
   representing an out-of-stock condition, in the second slot in the inventory structure, in a second graphical representation of the store corresponding to a current stock condition of the store; and
   flagging the second slot in the inventory structure for restocking with product units of a second product type assigned to the second slot by the graphical representation of the store.

6. The method of claim 1, further comprising:
accessing a second image captured by a second optical sensor, arranged within the store and offset from the optical sensor, at approximately the first time;
detecting a second segment of the inventory structure in the store in a second region of the second image;
identifying a second set of slots within the second segment of the inventory structure;
retrieving a second product model representing a second set of visual characteristics of a second product type assigned to a second slot, in the second set of slots, by the graphical representation of the store;
extracting a second set of features from the second image;
detecting presence of a second product unit of the second product type occupying the second segment of the inventory structure at the first time in response to the second set of features approximating the second set of visual characteristics;
detecting a second shelf tag in the second image;
interpreting a second set of possible product identifiers from the second shelf tag; and
confirming accuracy of the second shelf tag in response to the second set of possible product identifiers comprising a second product identifier of the second product type.

7. The method of claim 6, further comprising:
accessing a third image:
   captured by a robotic system during a scan cycle intersecting the first time; and
   depicting a third segment of the inventory structure between the segment of the inventory structure and the second segment of the inventory structure;
reading a third product identifier of a third product type from a third shelf tag detected in the third photographic image;
retrieving a third product model representing a third set of visual characteristics of the third product type;

based on the third shelf tag detected in the third photographic image, locating a third region in the third photographic image depicting a third slot in the inventory structure;
extracting a third set of features from the third region of the third photographic image; and
detecting presence of a third product unit of the third product type occupying the third slot in the third segment of the inventory structure during the scan cycle in response to the third set of features approximating the third set of visual characteristics represented in the third product model; and
aggregating presence of the first product unit occupying the first segment of the inventory structure, presence of the second product unit occupying the second segment of the inventory structure, and presence of the third product unit occupying the third segment of the inventory structure into a second graphical representation corresponding to a current stock state of the inventory structure.

8. The method of claim 1, further comprising:
locating a first slot boundary around the first slot, depicted in the image, according to a first position of the first shelf tag in the image;
extracting a second position of the first product unit relative to the first slot boundary from the image; and
in response to the second position of the first product unit falling outside of the first slot boundary:
flagging the first slot for reorganization of a set of product units comprising the first product unit; and
generating a prompt to reorganize the first slot in the inventory structure; and
transmitting the prompt to a computing device associated with a store associate.

9. The method of claim 1:
further comprising, at the optical sensor:
in response to detecting cessation of motion in the field of view of the optical sensor at a second time preceding the first time, setting a timer for a delay duration;
in response to expiration of the timer at the first time, capturing the image; and
in response to detecting a difference between the image and a previous image captured by the optical sensor prior to the first time, transmitting the image to a remote computer system; and
wherein accessing the image captured comprises, at the remote computer system, receiving the image from the optical sensor.

10. The method of claim 1:
wherein retrieving the first product model comprises retrieving the first product model representing the first set of visual characteristics of a first packaging face of a first product type;
wherein detecting presence of the first product unit of the first product type occupying the segment of the inventory structure comprises detecting presence of the first product unit of the first product type, in a first orientation, occupying the segment of the inventory structure in response to the first set of features approximating the first set of visual characteristics; and
further comprising:
retrieving a second product model representing a second set of visual characteristics of a second packaging face of the first product type;
extracting a second set of features from the image;
detecting presence of a second product unit of the first product type, in a second orientation, occupying the segment of the inventory structure at the first time in response to the second set of features approximating the second set of visual characteristics; and
flagging the second product unit for rearrangement in response to the second orientation deviating from a target orientation assigned to the first product type.

11. The method of claim 10, wherein flagging the second product unit for rearrangement comprises, in response to the second orientation deviating from the target orientation assigned to the first product type:
generating a prompt to rearrange the second product unit in the second slot of the inventory structure; and
serving the prompt to a computing device associated with a store associate.

12. The method of claim 10, further comprising:
representing presence of the first product unit, in the first orientation and occupying the segment of the inventory structure at the first time, in a second graphical representation of the store corresponding to a current stock condition of the store; and
representing presence of the second product unit, in the second orientation and occupying the segment of the inventory structure at the first time, in the second graphical representation of the store.

13. The method of claim 1:
wherein interpreting the set of possible product identifiers from the first shelf tag comprises interpreting a price value from the first shelf tag; and
further comprising:
querying the graphical representation of the store for a current list price assigned to the first product unit of the first product type; and
flagging the first tag for correction in response to the price value differing from the current list price.

14. The method of claim 1:
further comprising, detecting a set of objects in the first region of the image;
wherein detecting the first set of features in the image comprises detecting the first set of features in the subregion of the image depicting a first object in the set of objects;
wherein detecting presence of the first product unit of the first product type occupying the segment of the inventory structure comprises identifying the first object in the set of objects as a second product unit, in a first subset of product units, of the first product type in response to the first set of features approximating the first set of visual characteristics; and
further comprising:
detecting a second set of features in a second subregion of the image depicting a second object in the set of objects;
identifying the second object in the set of objects as a third product unit, in a second subset of product units, of a second product type different from the first product type in response to the second set of features differing from the first set of visual characteristics; and
representing presence of the first subset of product units, of the first product type and occupying the segment of the inventory structure, in a second graphical representation corresponding to a current stock condition of the store.

15. The method of claim 14, further comprising:
retrieving a second product model representing a second set of visual characteristics of a third product type assigned to a second slot, in the set of slots, by the graphical representation of the store;
detecting a third set of features in a third subregion of the image depicting a third object in the set of objects;
identifying the third object as a fourth product unit, in a third subset of product units, of the second product type in response to the third set of features approximating the second set of visual characteristics;
representing presence of the third subset of product units, of the second product type and occupying the segment of the inventory structure, in the second graphical representation of the store; and
flagging the segment of the inventory structure for restocking with product units of the second product type in response to the third subset of product units comprising a null set.

16. A method comprising:
accessing an image captured by an optical sensor, arranged within a store, at a first time;
detecting a segment of an inventory structure in the store in a first region of the image;
identifying a set of slots within the segment of the inventory structure;
accessing a first product model representing a first set of visual characteristics of a first product type assigned to a first slot, in the set of slots, by a graphical representation of the store;
detecting a first set of features in a subregion of the image;
detecting presence of a first product unit of the first product type occupying the segment of the inventory structure at the first time in response to the first set of features approximating the first set of visual characteristics;
detecting a first shelf tag in the image;
interpreting a set of possible product identifiers from the first shelf tag; and
confirming accuracy of the first shelf tag in response to the set of possible product identifiers including a first product identifier of the first product type.

17. The method of claim 16:
wherein accessing the first product model representing the first set of visual characteristics of the first product type comprises retrieving the first product model representing the first set of visual characteristics of the first product type assigned to the first slot, in the set of slots, by a first graphical representation of the store representing a target stock condition of the store; and
further comprising:
locating a first slot boundary around the first slot, depicted in the image, according to a first position of the first shelf tag in the image;
extracting a second position of the first product unit relative to the first slot boundary from the image; and
representing the second position of the first product unit, relative to the first slot boundary, in a second graphical representation of the store representing a current stock condition of the store.

18. The method of claim 16:
wherein accessing the first product model representing the first set of visual characteristics of the first product type assigned to the first slot comprises accessing the first product model defining a template histogram of pixel color values of the first product type assigned to the first slot, in the set of slots, by the graphical representation of the store;
wherein detecting the first set of features in the subregion of the image comprises detecting the first set of features in the subregion of the image, the first set of features representing a histogram of pixel color values; and
further comprising detecting presence of the first product unit of the first product type occupying the segment of the inventory structure at the first time in response to the histogram of pixel color values approximating the template histogram of color values.

19. The method of claim 16:
further comprising dispatching a robotic system to autonomously navigate along a set of inventory structures, comprising the first inventory structure, in the store and capture images of the set of inventory structures during a scan cycle;
wherein accessing the image captured by the optical sensor comprises accessing the image captured by the optical sensor, arranged in the robotic system, at the first time during the scan cycle;
further comprising:
accessing a location and an orientation of the optical sensor within a coordinate system of the store at the first time;
retrieving a set of imaging properties of the optical sensor;
calculating a position of a focal axis of the optical sensor within the coordinate system of the store based on the location and the orientation of the optical sensor;
calculating a volumetric imaging boundary extending along the focal axis of the optical sensor based on the set of imaging properties of the optical sensor; and
storing the volumetric imaging boundary as a geometry of the field of view of the optical sensor at the first time; and
wherein detecting the segment of the inventory structure in the store in the first region of the image comprises:
projecting the volumetric imaging boundary onto the graphical representation referenced to the coordinate system of the store; and
calculating the segment of the inventory structure based on an intersection of the volumetric imaging boundary and a representation of the inventory structure in the graphical representation of the store.

20. A method comprising:
accessing an image captured by an optical sensor, arranged within the store, at a first time;
retrieving a field of view of the optical sensor at the first time;
estimating a segment of an inventory structure in the store depicted in the image based on a projection of the field of view onto a graphical representation of the store;
accessing a first product model representing a first set of visual characteristics of a first packaging face of a first product type;
detecting a first set of features in the image;
detecting presence of a first product unit of the first product type, in a first orientation, occupying the segment of the inventory structure in response to the first set of features approximating the first set of visual characteristics; and flagging the first product unit for rearrangement in response to the first orientation deviating from a target orientation assigned to the first product type.

\* \* \* \* \*